(12) United States Patent
Pallaver et al.

(10) Patent No.: US 11,327,619 B2
(45) Date of Patent: May 10, 2022

(54) TOUCHSCREEN DEVICE WITH NON-ORTHOGONAL ELECTRODES

(71) Applicant: Elo Touch Solutions, Inc., Milpitas, CA (US)

(72) Inventors: Vincent Pallaver, Longmont, CO (US); Joel Kent, Fremont, CA (US)

(73) Assignee: Elo Touch Solutions, Inc., Milpitas, CA (US)

( * ) Notice: Subject to any disclaimer, the term of this patent is extended or adjusted under 35 U.S.C. 154(b) by 0 days.

(21) Appl. No.: 17/028,357

(22) Filed: Sep. 22, 2020

(65) Prior Publication Data

US 2022/0091696 A1 Mar. 24, 2022

(51) Int. Cl.
*G06F 3/044* (2006.01)
*G06F 3/041* (2006.01)

(52) U.S. Cl.
CPC .......... *G06F 3/0446* (2019.05); *G06F 3/0416* (2013.01); *G06F 3/0448* (2019.05)

(58) Field of Classification Search
CPC ..... G06F 3/0446; G06F 3/0448; G06F 3/0416
See application file for complete search history.

(56) References Cited

U.S. PATENT DOCUMENTS

| | | | | |
|---|---|---|---|---|
| 8,525,799 B1* | 9/2013 | Grivna | ................ | G06F 3/0446 345/173 |
| 9,128,574 B2* | 9/2015 | Song | ................ | G06F 3/04164 |
| 9,292,145 B2* | 3/2016 | Berget | ................ | G06F 1/1643 |
| 9,606,693 B2* | 3/2017 | Berget | ................ | G06F 3/04186 |
| 10,534,487 B2* | 1/2020 | Binstead | ................ | G06F 3/0446 |
| 2008/0150906 A1* | 6/2008 | Grivna | ................ | G06F 3/04166 345/173 |
| 2008/0225011 A1* | 9/2008 | Ito | ................ | G06F 1/1637 345/173 |
| 2010/0156795 A1* | 6/2010 | Kim | ................ | G06F 3/0416 345/168 |
| 2012/0062250 A1* | 3/2012 | Kuo | ................ | G06F 3/041 324/686 |
| 2012/0075239 A1* | 3/2012 | Azumi | ................ | G06F 3/0446 345/174 |
| 2012/0146944 A1* | 6/2012 | Lee | ................ | G06F 3/0446 345/174 |

(Continued)

*Primary Examiner* — Amy Onyekaba
(74) *Attorney, Agent, or Firm* — Sterne, Kessler, Goldstein & Fox P.L.L.C.

(57) ABSTRACT

Some embodiments include a touchscreen device (e.g., a projected capacitive sensor) with non-orthogonal U-drive and V-sense electrodes that intersect at an acute angle, θ. The touchscreen device includes a rectangular touch sensitive area with horizontal edge of length W and a vertical edge of length H. Some embodiments include a controller coupled to the touchscreen device that transmits signals via N drive channels, where N is an integer, where the N drive channels are communicatively coupled to P U-drive electrodes, and where P is an integer greater than or equal to N. Members of a subset of the P U-drive electrodes communicatively coupled to one of the N drive channels, intersect mutually exclusive sets of the V-sense electrodes. Motivated by signal-to-noise ratio considerations, values of acute angle, θ, are chosen such that signals corresponding to the drive signals traverse path lengths that are less than W plus H.

10 Claims, 17 Drawing Sheets

(56) References Cited

U.S. PATENT DOCUMENTS

| | | | | |
|---|---|---|---|---|
| 2012/0193130 A1* | 8/2012 | Fix | ............................ | G06F 3/045 |
| | | | | 174/255 |
| 2012/0206379 A1* | 8/2012 | Ho | ......................... | G06F 3/0443 |
| | | | | 345/173 |
| 2013/0127769 A1* | 5/2013 | Guard | .................... | G06F 3/0443 |
| | | | | 345/174 |
| 2013/0127771 A1* | 5/2013 | Carley | ................... | G06F 3/0446 |
| | | | | 345/174 |
| 2014/0009438 A1* | 1/2014 | Liu | ........................ | G06F 3/0443 |
| | | | | 345/174 |
| 2014/0218645 A1* | 8/2014 | Miyamoto | ............ | G06F 3/0446 |
| | | | | 349/12 |
| 2014/0291008 A1* | 10/2014 | Huang | .................. | G06F 3/0445 |
| | | | | 174/268 |
| 2014/0299357 A1* | 10/2014 | Nakamura | ........... | G06F 3/04164 |
| | | | | 174/250 |
| 2014/0299361 A1* | 10/2014 | Nakamura | ............ | G06F 3/0445 |
| | | | | 174/253 |
| 2015/0009175 A1* | 1/2015 | Berget | ................... | G06F 1/1643 |
| | | | | 345/174 |
| 2015/0085205 A1* | 3/2015 | Chen | ..................... | G06F 3/0448 |
| | | | | 349/12 |
| 2016/0018932 A1* | 1/2016 | Nakayama | .............. | G06F 3/041 |
| | | | | 345/173 |
| 2016/0209954 A1* | 7/2016 | Cho | ....................... | G06F 3/0443 |
| 2016/0274703 A1* | 9/2016 | Satou | .................... | G06F 3/0445 |
| 2016/0274727 A1* | 9/2016 | Nakamura | ............ | G06F 3/0448 |
| 2016/0370920 A1* | 12/2016 | Fan | ........................ | G06F 3/0445 |
| 2017/0068379 A1* | 3/2017 | Liu | ......................... | G06F 3/0445 |
| 2017/0123546 A1* | 5/2017 | Zhan | ..................... | G06F 3/0412 |
| 2017/0185187 A1* | 6/2017 | Nakayama | ............ | G06F 3/0445 |
| 2018/0018051 A1* | 1/2018 | Ogura | ................... | G06F 3/0412 |
| 2018/0217696 A1* | 8/2018 | Binstead | ............... | G06F 3/0446 |
| 2020/0321457 A1* | 10/2020 | Bramanti | .............. | H01L 29/205 |
| 2021/0223908 A1* | 7/2021 | He | ......................... | G06F 3/0443 |

* cited by examiner

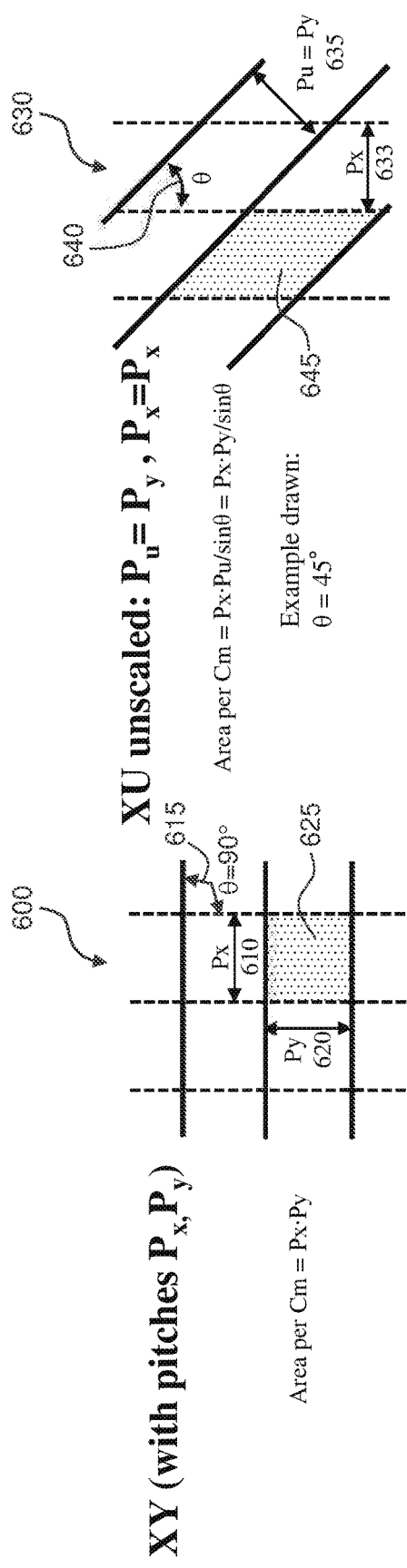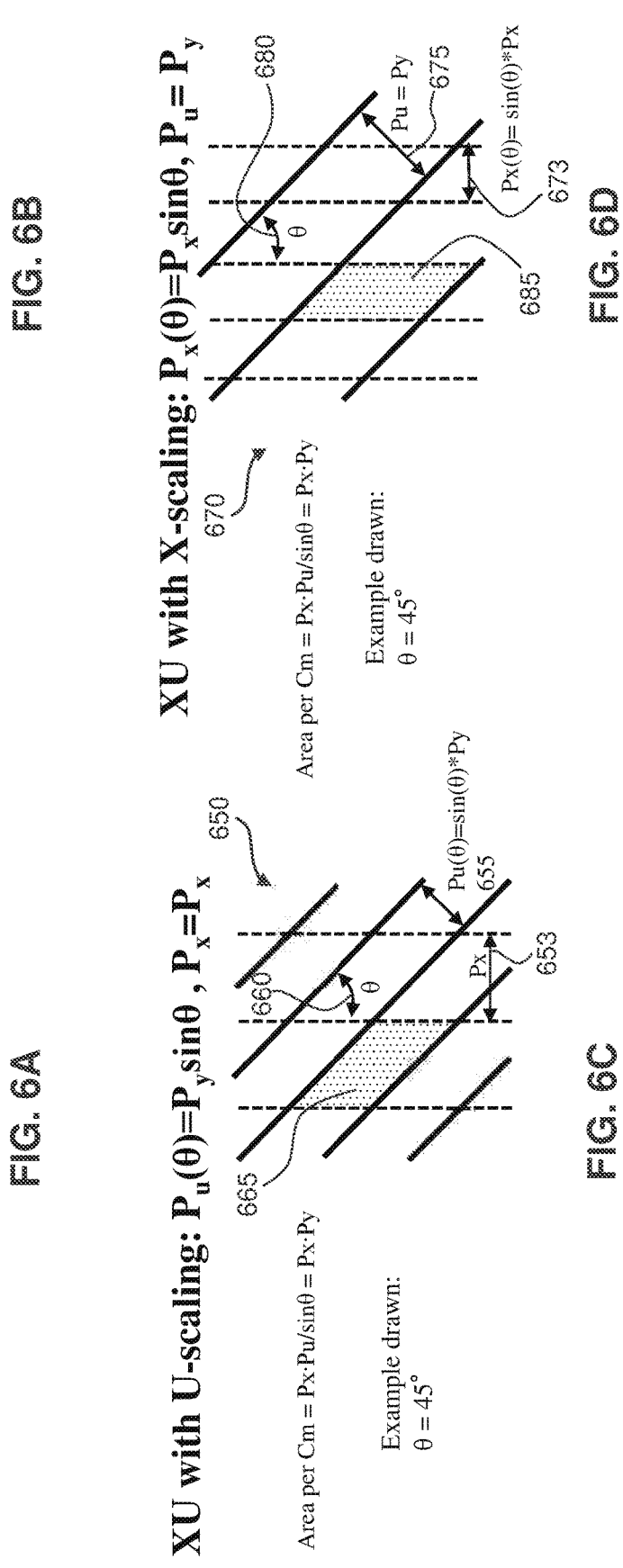
FIG. 6A
FIG. 6B
FIG. 6C
FIG. 6D

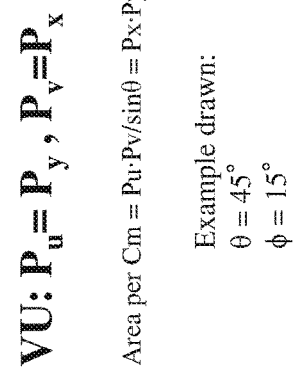

XY (with pitches $P_x$, $P_y$)

Area per Cm = $P_x \cdot P_y$

FIG. 8A

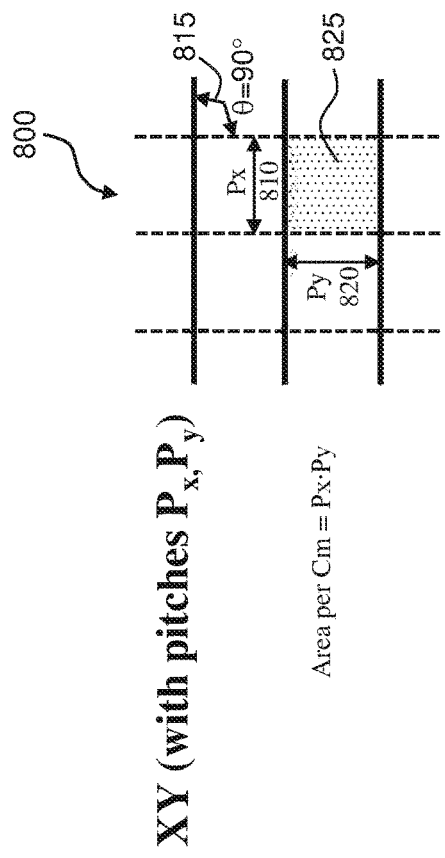

VU: $P_u = P_y$, $P_v = P_x$

Area per Cm = $P_u \cdot P_v / \sin\theta = P_x \cdot P_y / \sin\theta$

Example drawn:
$\theta = 45°$
$\phi = 15°$

FIG. 8B

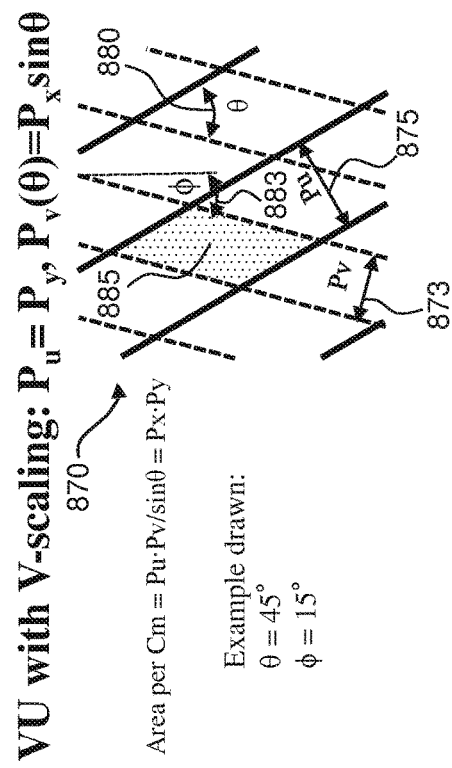

VU with U-scaling: $P_u(\theta) = P_y \sin\theta$, $P_v = P_x$

Area per Cm = $P_u \cdot P_v / \sin\theta = P_x \cdot P_y$

Example drawn:
$\theta = 45°$
$\phi = 15°$

FIG. 8C

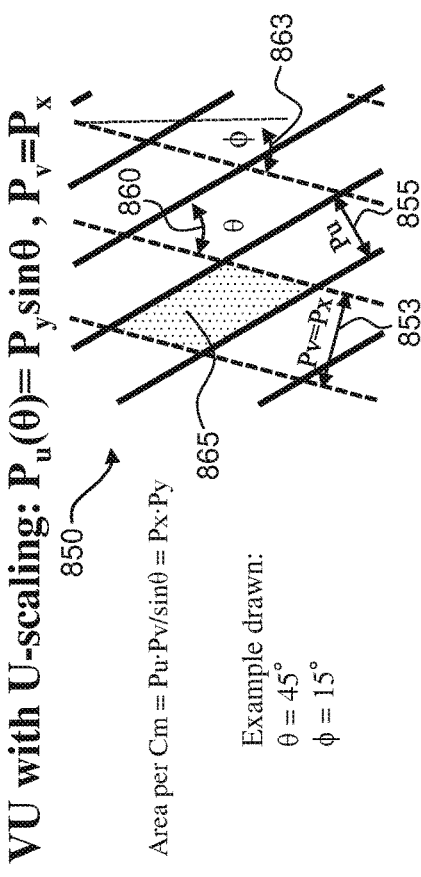

VU with V-scaling: $P_u = P_y$, $P_v(\theta) = P_x \sin\theta$

Area per Cm = $P_u \cdot P_v / \sin\theta = P_x \cdot P_y$

Example drawn:
$\theta = 45°$
$\phi = 15°$

FIG. 8D

Key:
Dashed line – the number of physical U electrodes on the screen
Solid line – the number of drive channels required by controller solution

TOUCHSCREEN DEVICE WITH NON-ORTHOGONAL ELECTRODES

BACKGROUND

Field

The present disclosure relates generally to a touchscreen device, and in particular, a touchscreen device with non-orthogonal electrodes.

Background Art

Touchscreen devices include drive electrodes and receive electrodes orthogonally arranged in a rectangular active area of the touchscreen device.

SUMMARY

Some embodiments include a system, method, computer program product, and/or combination(s) or sub-combination(s) thereof, for a touchscreen device with drive electrodes and receive electrodes non-orthogonally arranged in an active area of the touchscreen device. Some embodiments include a touchscreen device with U-drive electrodes and V-sense electrodes that intersect at an acute angle, $\theta$, having a rectangular touch sensitive area with horizontal edge of length W and a vertical edge of length H. Some embodiments include a controller coupled to the touchscreen device, configured to transmit drive signals via N drive channels, where N is an integer, where the N drive channels are communicatively coupled to P U-drive electrodes, and P is an integer greater than or equal to N. Members of a subset of the P U-drive electrodes communicatively coupled to one of the N drive channels can intersect mutually exclusive sets of the V-sense electrodes. Based on a value of $\theta$, signals corresponding to the drive signals traverse path lengths on the rectangular touch sensitive area that are less than W plus H.

In some embodiments, the path lengths corresponding to the drive signals are less than H plus half of W. In some embodiments, $\varphi$ includes an acute angle between the vertical edge and V-sense electrodes. In some embodiments, $\theta_D$ comprises an angle between the vertical edge and a diagonal of the rectangular touch sensitive area, where $0° < \theta < \theta_D$. In some embodiments where $\varphi = 0$, a signal-to-noise ratio (SNR) quantity $$\left(1 + \frac{R}{2}\right)\cos(\theta)$$

is greater than one, where an aspect ratio, R, equals $\tan(\theta_D)$. In other words, a touchscreen device with an XU orthogonal electrode pattern with U-scaling may have improved sensitivity over a touchscreen device with an XY orthogonal electrode pattern for $0° < \theta < \theta_D$. A pitch of the U-drive electrodes can be less than a pitch of the X-sense electrodes. For example, the pitch of the U-drive electrodes can be equal to $\sin(\theta)$ times the pitch of the X-sense electrodes.

In some embodiments where $\varphi = 0$, an SNR quantity $$\left(1 + \frac{R}{2}\right)\cos(\theta)\sqrt{\frac{1}{\sin\theta}}$$

is greater than one, wherein aspect ratio, R, equals $\tan(\theta_D)$. In other words, a touchscreen device with an XU orthogonal electrode pattern with X-scaling may have improved sensitivity over a touchscreen device with an XY orthogonal electrode pattern for $0° < \theta < \theta_D$. A pitch of the X-sense electrodes can be less than a pitch of the U-drive electrodes. Further, the pitch of the X-sense electrodes can be equal to $\sin(\theta)$ times the pitch of the U-drive electrodes.

In some embodiments, $\theta_D$ comprises an angle between the vertical edge and a diagonal of the rectangular touch sensitive area, where $0° < \theta < \theta_D$, and where $0° < \varphi < \arctan(W/(2H))$, where $\varphi$ comprises an acute angle between the vertical edge and V-sense electrodes. In some embodiments an SNR quantity $$\sqrt{\frac{\left(1 + \frac{R}{2}\right)^2 \cos\phi}{\max\left(\frac{1}{\cos^2\phi}, \frac{1}{\cos^2(\theta - \phi)}\right)}}$$

is greater than one, wherein aspect ratio, R, equals $\tan(\theta_D)$. In other words, a touchscreen device with a VU orthogonal electrode pattern with U-scaling may have improved sensitivity over a touchscreen device with an XY orthogonal electrode pattern for $0° < \theta < \theta_D$ and $0° < \varphi < \arctan(W/(2H))$. A pitch of the U-drive electrodes can be less than a pitch of the V-sense electrodes where the pitch of the U-drive electrodes can be equal to $\sin(\theta)$ times the pitch of the V-sense electrodes.

In some embodiments an SNR quantity $$\sqrt{\frac{\left(1 + \frac{R}{2}\right)^2 \cos\phi}{\sin\theta \max\left(\frac{1}{\cos^2\phi}, \frac{1}{\cos^2(\theta - \phi)}\right)}}$$

is greater than one, wherein aspect ratio, R, equals $\tan(\theta_D)$. In other words, a touchscreen device with a VU orthogonal electrode pattern with V-scaling may have improved sensitivity over a touchscreen device with an XY orthogonal electrode pattern for $0° < \theta < \theta_D$ and $0° < \varphi < \arctan(W/(2H))$. The pitch of the V-sense electrodes can be less than the pitch of the U-drive electrodes. Further, the pitch of the V-sense electrodes can be equal to $\sin(\theta)$ times the pitch of the U-drive electrodes.

Further embodiments, features, and advantages of the present disclosure, as well as the structure and operation of the various embodiments of the present disclosure, are described in detail below with reference to the accompanying drawings.

BRIEF DESCRIPTION OF THE DRAWINGS/FIGURES

The accompanying drawings, which are incorporated herein and form part of the specification, illustrate the present disclosure and, together with the description, further serve to explain the principles of the disclosure and to enable a person skilled in the relevant art(s) to make and use the disclosure.

FIG. 6A illustrates an example an XY orthogonal electrode pattern grid overlap area, according to an exemplary embodiment of the disclosure;

FIG. 6B illustrates an example an XU non-orthogonal electrode pattern with an unscaled grid overlap area, according to an exemplary embodiment of the disclosure;

FIG. 6C illustrates an example an XU non-orthogonal electrode pattern grid overlap area with U-scaling, according to an exemplary embodiment of the disclosure;

FIG. 6D illustrates an example an XU non-orthogonal electrode pattern grid overlap area with X-scaling, according to an exemplary embodiment of the disclosure;

FIG. 8A illustrates an example an XY orthogonal electrode pattern grid overlap area, according to an exemplary embodiment of the disclosure;

FIG. 8B illustrates an example a VU non-orthogonal electrode pattern grid with an unscaled grid overlap area, according to an exemplary embodiment of the disclosure;

FIG. 8C illustrates an example a VU non-orthogonal electrode pattern grid overlap area with U-scaling, according to an exemplary embodiment of the disclosure;

FIG. 8D illustrates an example a VU non-orthogonal electrode pattern grid overlap area with V-scaling, according to an exemplary embodiment of the disclosure;

Figure 1:
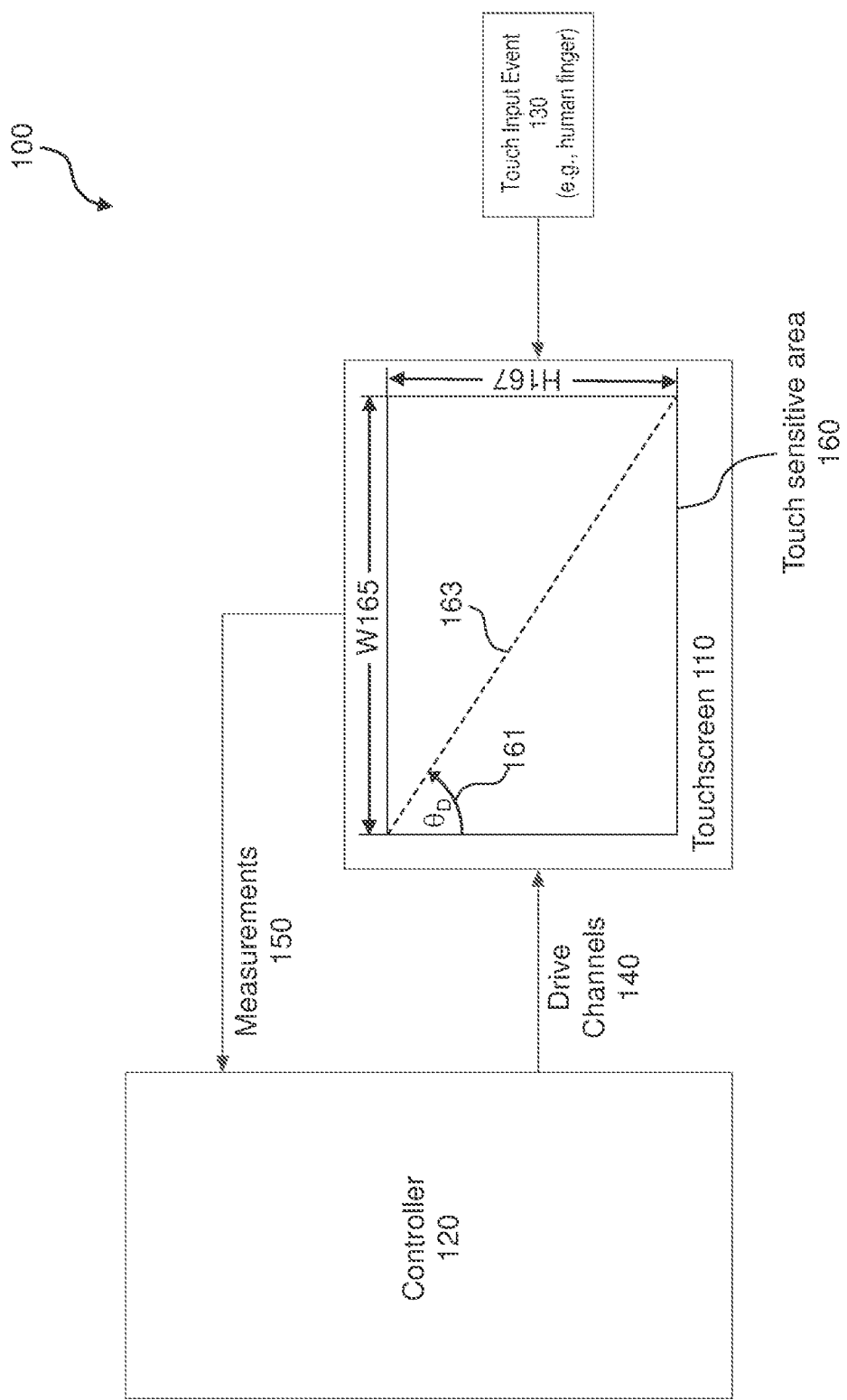
FIG. 1 illustrates an example system supporting a touchscreen device with non-orthogonal electrodes, according to an exemplary embodiment of the disclosure.

The present disclosure will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The following Detailed Description of the present disclosure refers to the accompanying drawings that illustrate exemplary embodiments consistent with this disclosure. The exemplary embodiments will fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein. Therefore, the detailed description is not meant to limit the present disclosure.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

A touchscreen device typically includes a grid of parallel drive electrodes arranged orthogonally with parallel sense electrodes. The orthogonal arrangement presents a grid of capacitors to a controller. The controller provides the electronics to transmit drive signals to the touchscreen device and to sense the grid of capacitances. Each capacitance on the grid can be scanned by transmitting a pulse on a corresponding drive electrode, and detecting a signal on the corresponding receive electrode.

Some embodiments include a touchscreen device with a non-orthogonal geometry of parallel drive electrodes and parallel sense electrodes with improved sensitivity over a touchscreen device with orthogonal geometry. In some embodiments, a controller can operate with a first touchscreen device with a set of touch performance characteristics, where the first touchscreen device has an orthogonal electrode geometry. The same controller (or same type of controller) can be used to operate a second touchscreen device with a non-orthogonal electrode geometry that is scaled to preserve the set of touch performance characteristics. In other words, the performance of the controller does not change when coupled with the first touchscreen device or the second touchscreen device.

A touchscreen device is dominated by parallel-plate mutual capacitances (Cm) that are dependent on an area. While non-orthogonal electrode geometry is different than orthogonal electrode geometry, arbitrary areas and corresponding Cm are preserved in the non-orthogonal electrode geometry due to the application of area-preserving shear distortion (e.g., scaling electrode pitches by a factor.) In some embodiments a touchscreen device with non-orthogonal electrode geometry can have an increased touch sensitivity (e.g., increased signal-to-noise ratio (SNR)) over a touchscreen device with orthogonal electrode geometry without increasing the number of drive channels.

FIG. 1 illustrates an example system 100 supporting touchscreen device 110 with non-orthogonal electrodes, according to an exemplary embodiment of the disclosure. System 100 includes touchscreen device 110 that includes touch sensitive area 160, controller 120, and touch input event 130. Controller 120 transmits drive signals via drive channels 140 to touchscreen device 110, and receives measurements 150 corresponding to a sensed touch on touch sensitive area 160 of touchscreen device 110. Touchscreen device 110 can be a projected capacitive (PCAP) touchscreen device that can be placed in front of a display device (not shown) including but not limited to a monitor, computing device, a computer, a laptop, a tablet, and/or a mobile computing device. System 100 which includes controller 120 can include a connector (not shown) that electronically couples system 100 to the display device either directly or via a computer connected to the display device. A user can interact with software applications on the display device by touching touch sensitive area 160 of touchscreen device 110 via touch input event 130. Touch input event 130 includes but is not limited to a live touch (e.g., a finger) or a tool (e.g., a stylus) that is used to provide input to touch sensitive touch area 160. The effect that touch input event 130 has on touch sensitive touch area 160 varies based on the construction of materials (e.g., metal, plastic, human hand), shape, and/or a connection to ground.

Touch sensitive area 160 can be a rectangle of width (W) 165, and height (H) 167. Touch sensitive area 160 can be described by an aspect ratio, R, where R=W/H. Theta D ($\theta_D$) 161 is an acute angle formed by H 167 (e.g., a vertical edge of touch sensitive area 160) and diagonal 163.

Some embodiments use controller 120 and touch input event 130 whether coupled to touchscreen device 110 with non-orthogonal electrodes or an equivalent-sized touchscreen device with orthogonal electrodes. Thus, to maintain a given arbitrary capacitance area equivalent to that of a touchscreen device with orthogonal electrodes, dimensions of a corresponding arbitrary capacitance area in touchscreen device 110 with non-orthogonal electrodes can be scaled according to area-conserving shear linear transformations. In other words, controller 120 and touch input event 130 operate unchanged whether coupled to touchscreen device 110 with non-orthogonal electrodes or the equivalent sized touchscreen device with orthogonal electrodes.

Figure 7:
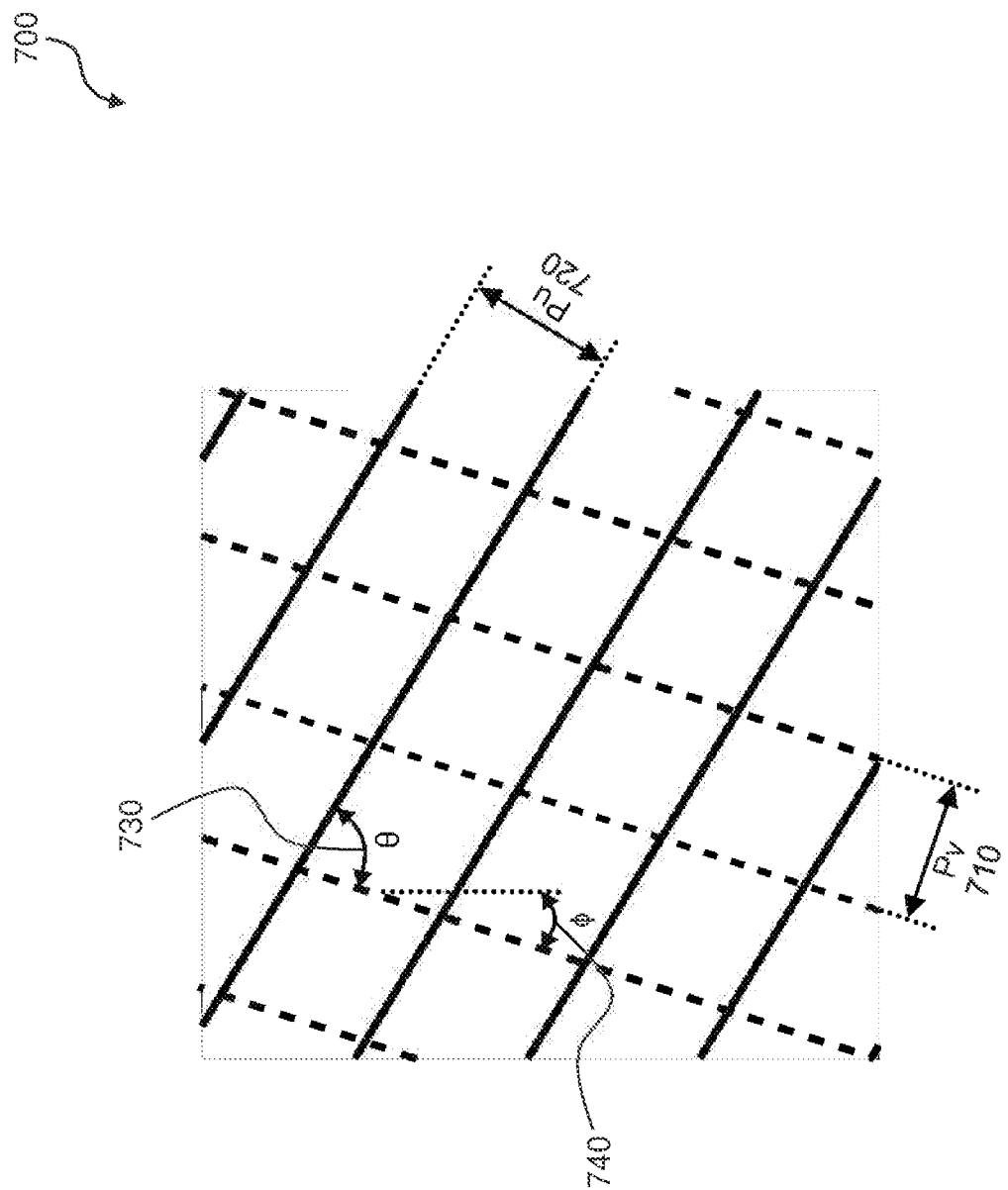
FIG. 7 illustrates an example of a non-orthogonal VU electrode pattern with schematic lines only, according to an exemplary embodiment of the disclosure.

The remainder of the disclosure is organized as follows: Examples of orthogonal XY electrode geometry, XU non-orthogonal electrode geometry, and schematic lines are described below in FIGS. 2A, 2B, 3A, 3B, 4A, 4B, 5A, and 5B. FIGS. 6A-6D describe methods for implementing area-preserving shear to maintain constant Cm in touchscreen device 110 with XU non-orthogonal electrode geometry. FIG. 7 describes VU non-orthogonal geometry and FIGS. 8A-8D describe methods for preserving Cm in touchscreen device 110 with VU non-orthogonal electrode geometry. FIGS. 9A, 9B, 10A-10C, 11A, and 11B describe aspects of the increased sensitivity of touchscreen device 110 with non-orthogonal electrode geometry. FIGS. 12-15 illustrate the improved sensitivity according to example variables. FIG. 16 illustrates an example computer system useful for implementing and/or using various embodiments.

Figure 2B:
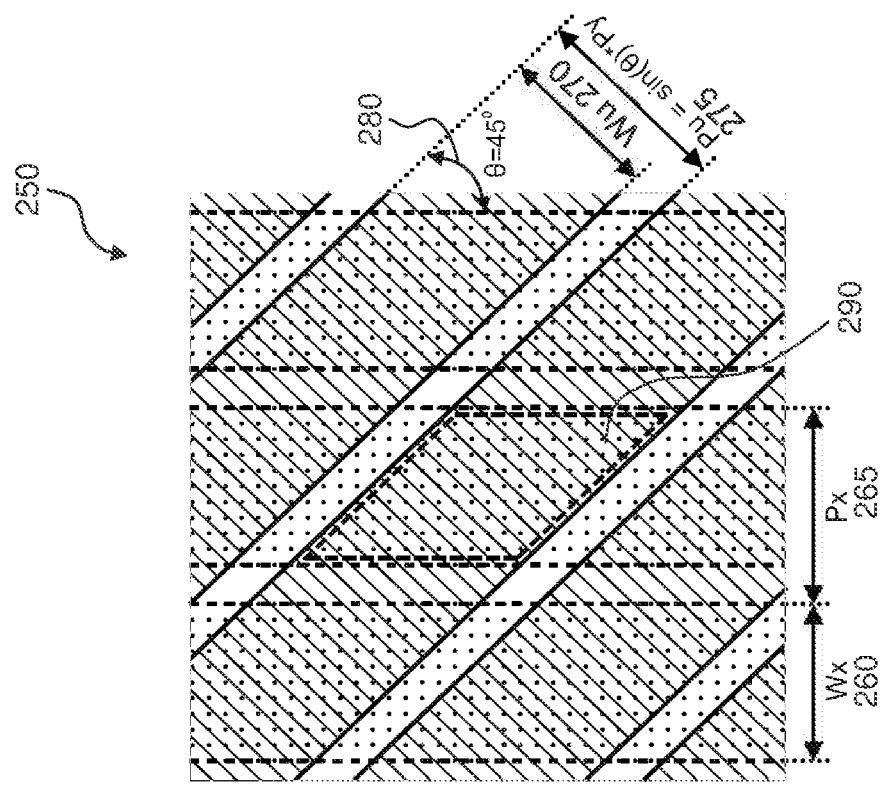
FIGS. 2A and 2B illustrate examples of orthogonal and XU non-orthogonal Manhattan electrode patterns, respectively, according to an exemplary embodiment of the disclosure.
Figure 2A:
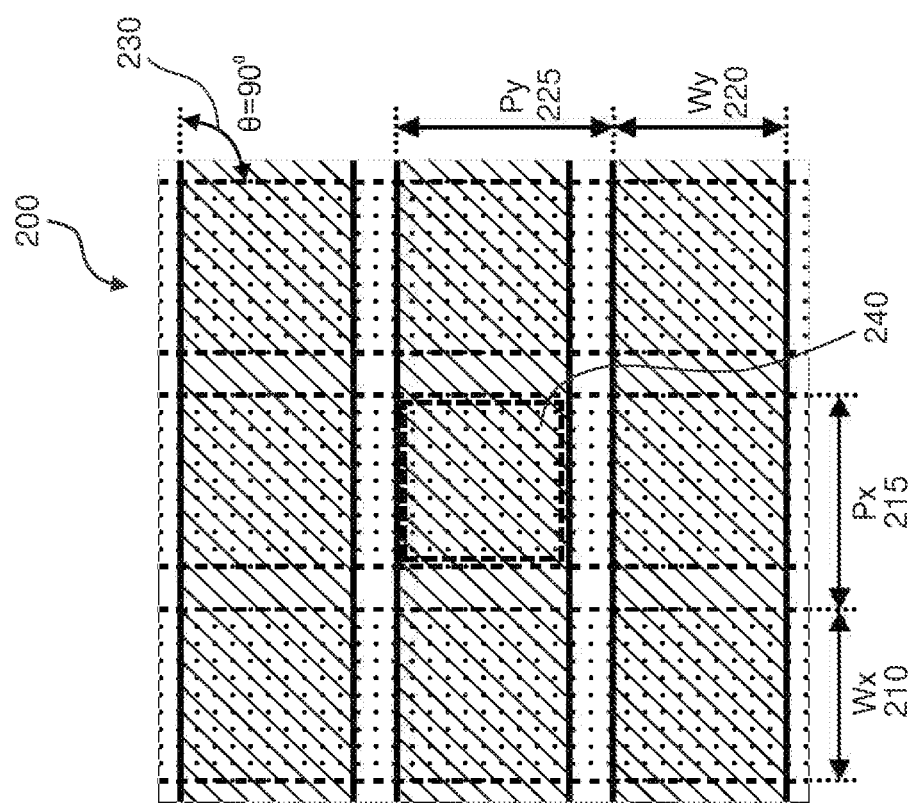

FIGS. 2A and 2B illustrate examples of orthogonal and XU non-orthogonal Manhattan patterns, 200 and 250 respectively, according to an exemplary embodiment of the disclosure. Touchscreen device 110 can include an XU non-orthogonal Manhattan pattern. As a convenience and not a limitation, patterns 200 and 250 may be described with elements from FIG. 1. FIGS. 2A and 2B represent only a detail or small portion of the electrode pattern of a touchscreen; for example, the areas shown in FIG. 2A or 2B may correspond to a small fraction of the touch sensitive area 160 of touchscreen device 110. These and other figures in this disclosure may not be drawn to scale. Pattern 200 illustrates orthogonal Manhattan electrodes that include horizontal Y-drive electrodes shaded with diagonal hashing and vertical X-sense electrodes shaded with dots. There are 9 plan-view overlap areas shown in FIG. 2A. Overlap area 240 marked by a dashed rectangle is the overlap area between the middle Y-drive electrode and the middle X-sense electrode. Note that the angle Theta (θ) 230 is the angle between X-sense and Y-drive electrode edges. In pattern 200, θ 230 equals 90°, a right angle, as the electrodes are orthogonal. Wx 210 denotes the widths of the X-sense electrodes (also referred to as X-receive electrodes) and Wy 220 denotes the widths of the Y-drive electrodes (also referred to as Y-transmit electrodes). Px 215 and Py 225 denote respective electrode pitches.

Pattern 250 illustrates non-orthogonal XU Manhattan electrodes that include diagonal U-drive electrodes shaded with diagonal hashing and vertical X-sense electrodes shaded with dots. Three complete plan-view overlap areas shown include overlap area 290 indicated by a dashed parallelogram. Overlap area 290 includes an overlap area between the middle U-drive electrode and the middle X-sense electrode. Note that the angle Theta (θ) 280 is the angle between X-sense and U-drive electrode edges. In pattern 250, θ 280 equals 45°, and the electrodes are non-orthogonal. Other values of θ 280 that are less than 90° are possible but are not shown here. The widths of the X-sense electrodes are noted as Wx 260 and the widths of the U-drive electrodes (also referred to as U-transmit electrodes) are noted as Wu 270. The respective electrode pitches are labeled as Px 265 and Pu 275.

Figure 3B:
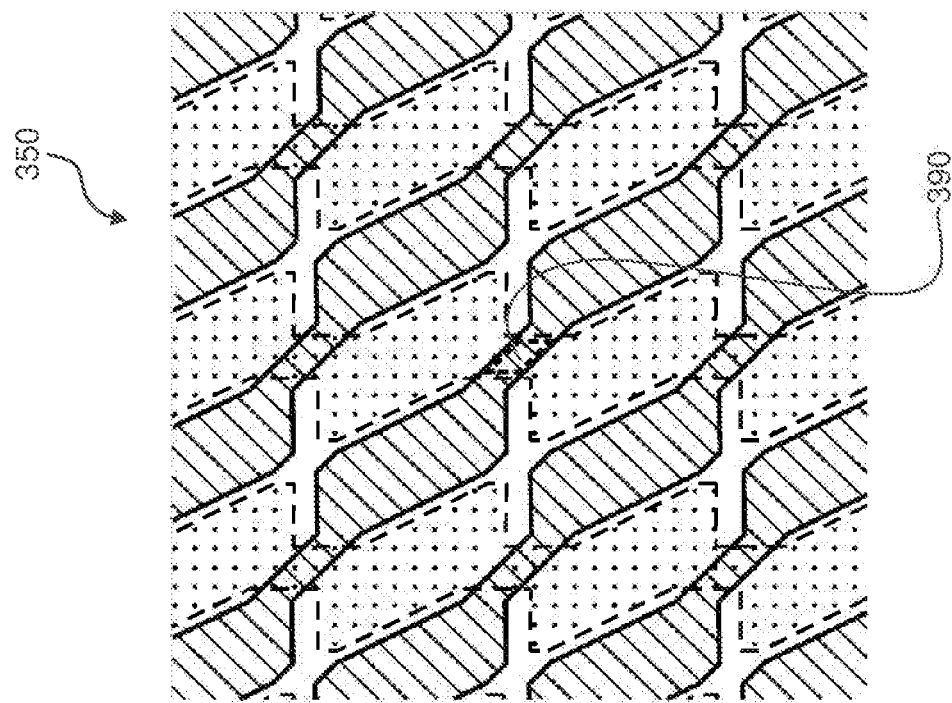
FIGS. 3A and 3B illustrate examples of orthogonal and XU non-orthogonal diamond electrode patterns, respectively, according to an exemplary embodiment of the disclosure.
Figure 3A:
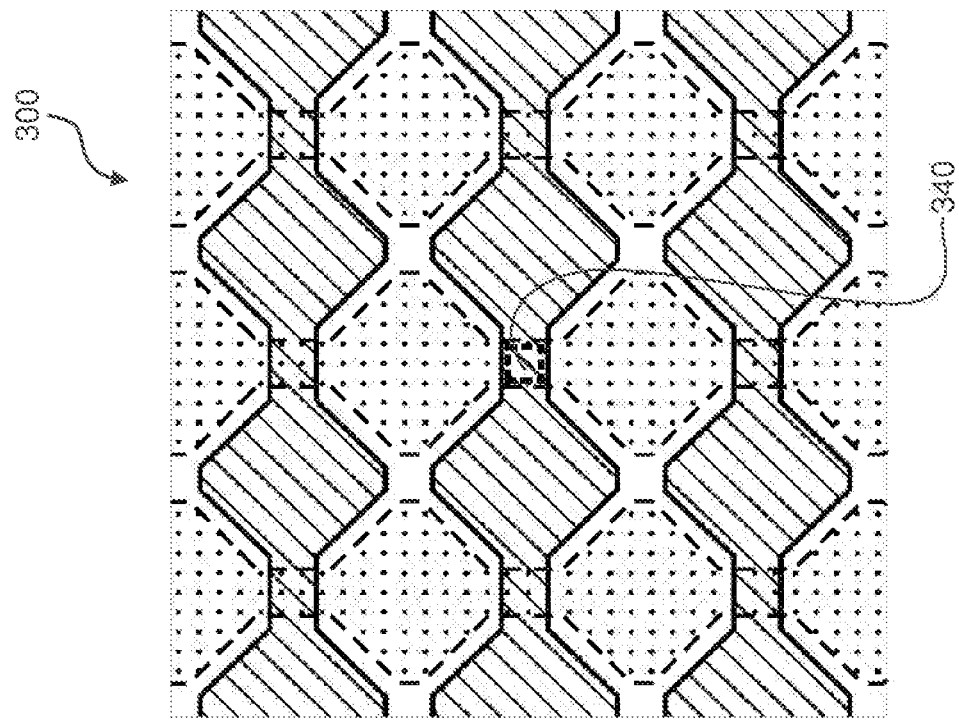

FIGS. 3A and 3B illustrate examples of orthogonal and XU non-orthogonal diamond patterns, 300 and 350, respectively, according to an exemplary embodiment of the disclosure. As a convenience and not a limitation, patterns 300 and 350 may be described with elements from FIGS. 1, 2A, and 2B. Pattern 300 includes orthogonal diamond electrodes with horizontal Y-drive electrodes shaded with diagonal hashing and vertical X-sense electrodes shaded with dots. The plan-view overlap between the middle Y-drive electrode and the middle X-sense electrode is indicated by a small dashed rectangle labeled as overlap area 340. Pattern 350 includes non-orthogonal XU diamond electrodes with diagonal U-drive electrodes shaded with diagonal hashing and vertical X-sense electrodes shaded with dots. The plan-view overlap between the middle U-drive electrode and the middle X-sense electrode is indicated by a small dashed parallelogram, overlap area 390.

Figure 4B:
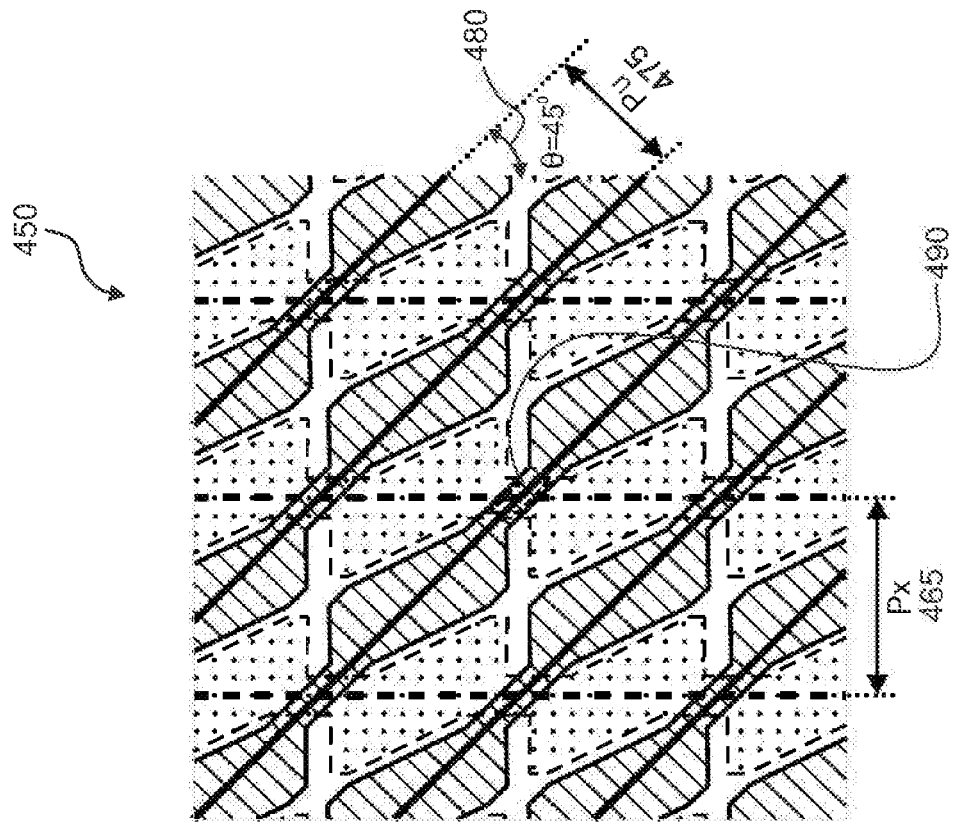
FIGS. 4A and 4B illustrate examples of orthogonal and XU non-orthogonal diamond electrode patterns with schematic lines, respectively, according to an exemplary embodiment of the disclosure.
Figure 4A:
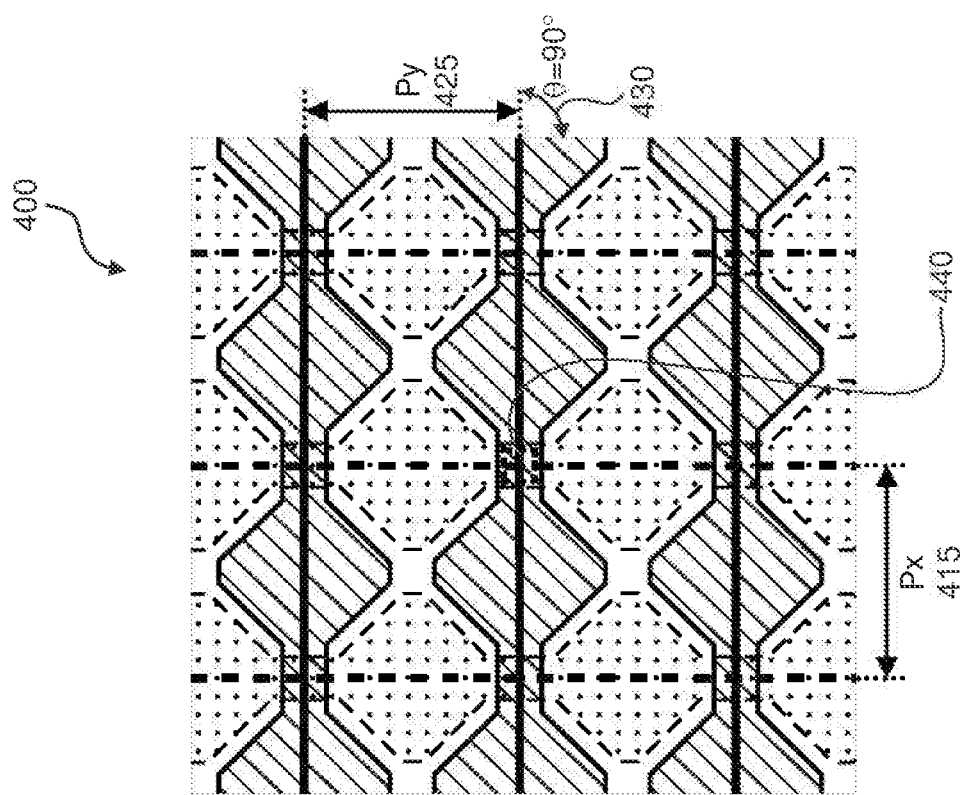

FIGS. 4A and 4B illustrate examples of orthogonal and XU non-orthogonal diamond patterns with schematic lines, 400 and 450 respectively, according to an exemplary embodiment of the disclosure. As a convenience and not a limitation, patterns 400 and 450 may be described with elements from previous figures. Pattern 400 includes orthogonal diamond electrodes of pattern 300, but with schematic lines. Heavy solid lines represent the horizontal Y-drive electrodes and heavy dashed lines represent the vertical X-sense electrodes. A plan-view overlap between the middle Y-drive electrode and middle X-sense electrode is indicated by a dashed rectangle, overlap area 440. Since the electrodes are orthogonal, θ 430 equals 90°. Respective electrode pitches are Px 415 and Py 425. Pattern 450 includes non-orthogonal diamond electrodes of pattern 350, but with schematic lines. Heavy solid lines represent the diagonal U-drive electrodes and heavy dashed lines represent the vertical X-sense electrodes. A dashed parallelogram, overlap area 490, indicates a plan-view overlap between the middle U-drive electrode and middle X-sense electrode. Since the electrodes are non-orthogonal, θ 480 in this example equals 45°, and other values of θ 480 are possible. Respective electrode pitches are Px 465 and Pu 475.

Figure 5B:
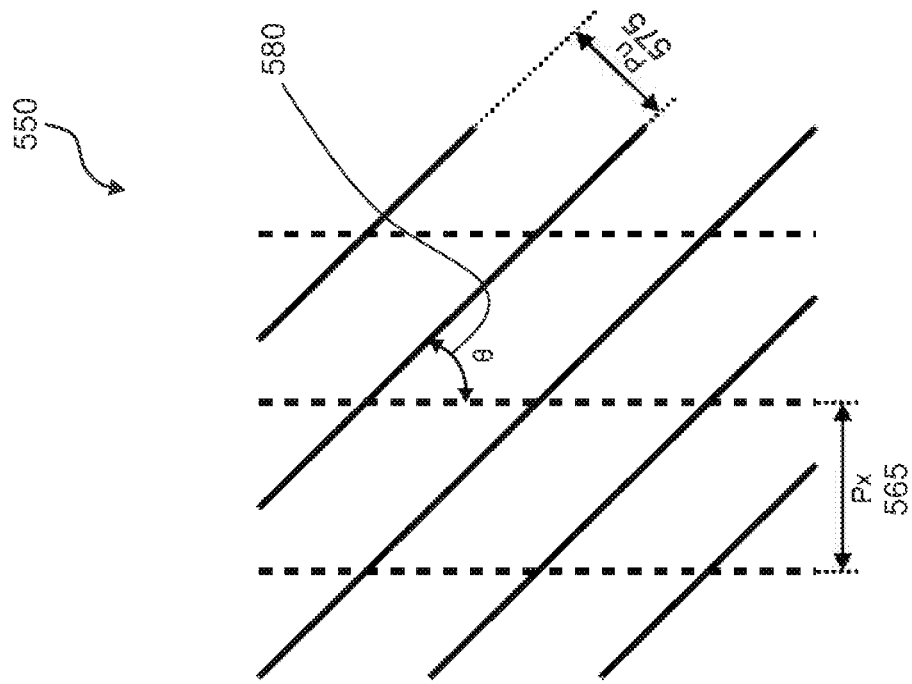
FIGS. 5A and 5B illustrate examples of orthogonal and XU non-orthogonal electrode patterns with schematic lines only, respectively, according to an exemplary embodiment of the disclosure.
Figure 5A:
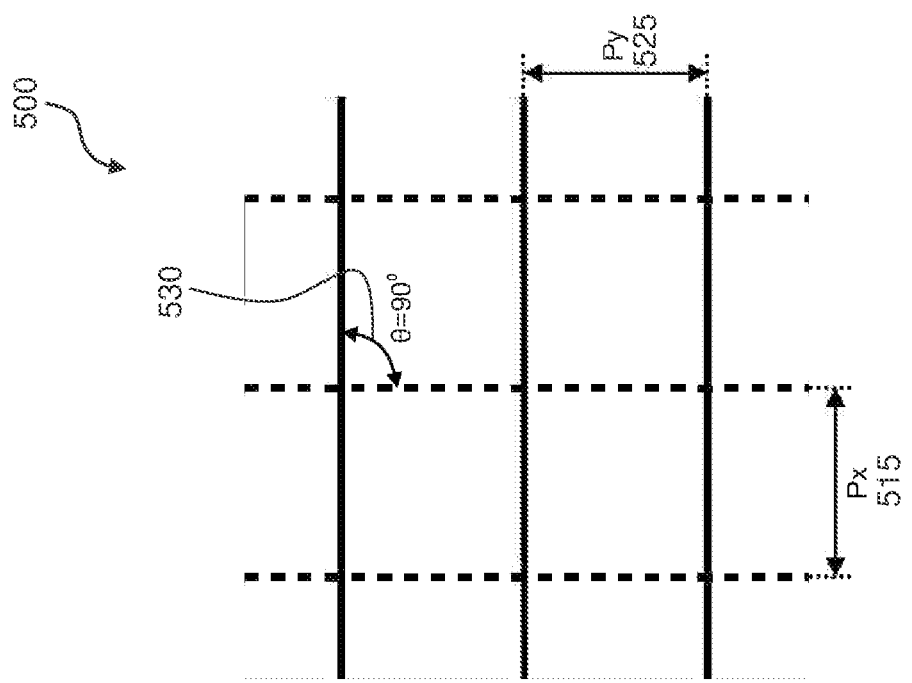

FIGS. 5A and 5B illustrate examples of orthogonal and XU non-orthogonal patterns with schematic lines only, 500 and 550 respectively, according to an exemplary embodiment of the disclosure. As a convenience and not a limitation, patterns 500 and 550 may be described with elements from previous figures. Pattern 500 as illustrated in FIG. 5A represents orthogonal electrodes only with schematic lines. Pattern 500, for example, refers to possible electrode patterns of a touchscreen that one could inspect with a microscope, but the schematic lines themselves would not be visible (e.g., they do not exist.) Heavy solid lines represent the horizontal Y-drive electrodes and heavy dashed lines represent the vertical X-sense electrodes. The schematic line drawing may represent Manhattan, diamond, or other electrode patterns. Since the electrodes are orthogonal, θ 530 equals 90°. Respective electrode pitches are Px 515 and Py 525. Pattern 550 includes non-orthogonal XU electrodes only with schematic lines. Heavy solid lines represent the diagonal U-drive electrodes and heavy dashed lines represent the vertical X-sense electrodes. The schematic line drawing may represent Manhattan, diamond, or other electrode patterns. Since the electrodes are non-orthogonal, θ 580 in this example is less than 90°. Respective electrode pitches are Px 565 and Pu 575.

As mentioned above, some embodiments include methods for implementing area-preserving shear so that controller 120 and touch input event 130 operate unchanged whether coupled to touchscreen device 110 with non-orthogonal electrodes or an equivalent sized touchscreen device with orthogonal electrodes. Examples of areas preserved that in turn preserve the Cm include overlap areas described above as well as grid overlap areas. FIGS. 6C-6D illustrate XU geometry with scaling to preserve Cm area. As a convenience and not a limitation, FIGS. 6A-6D may be described with elements from previous figures.

FIG. 6A illustrates an example an XY orthogonal pattern 600 with grid overlap area 625, according to an exemplary embodiment of the disclosure. Grid overlap area 625 may have units of square millimeters. The reciprocal of the grid overlap area 625 corresponds to the density of the Cm overlaps on touchscreen device 110. The density of Cm measurements made within touch sensitive area 160 may have units of Cm values digitized per square millimeter. More specifically the inverse or reciprocal of overlap area 625 is numerically equal to the number of Cm overlaps per unit area within the touch sensitive area 160. The density of Cm overlaps is not to be confused with the area of an individual Cm overlap. Depending on the type of electrode pattern (Manhattan, diamond, etc.) the area of an individual Cm overlap is some fixed fraction less than one of grid overlap area 625. Grid overlap area 625 is bounded by pitches Px 610 and Py 620, and is determined as Px times Py. Since the electrodes are orthogonal, θ 615 equals 90°. The density of the Cm of grid overlap area 625 can be used to control the accuracy of the measurements based on a touch input event on an equivalent touchscreen device with XY orthogonal pattern 600, and the determination of the location of the touch input event. Cm measured at the intersections of the schematic lines can be used to determine the distance of touch input events from the nearest intersections and hence the location of the touch input event on the equivalent sized touchscreen device with XY orthogonal pattern 600.

FIG. 6B illustrates an example an XU non-orthogonal pattern 630 with unscaled grid overlap area 645, according to an exemplary embodiment of the disclosure. Px and Py represent the pitches in the XY orthogonal pattern 600. In this unscaled example, Pu=Py and Px=Px. Grid overlap area 645 can be determined by pitches Px 633, Pu 635, and θ, and is calculated as Px·Pu(1/sin θ) which is equivalent to Px·Py (1/sin θ). As an example, θ 640=45°, but other values of θ 640<90° are possible. The reciprocal of the grid overlap area 645 corresponds to the density of the Cm overlaps on touchscreen device 110. Notice that there can be less intersections between U-drive electrodes and X-sense electrodes compared to the intersections of XY orthogonal pattern 600. Further, grid overlap area 645 is generally larger than grid overlap area 625, and the distances between the intersections increase. Thus, the measurement error for grid overlap area 645 measurements can be larger compared to the measurement error for grid overlap area 625 measurements. Accordingly, there can be less accuracy in determining where within grid overlap area 645 the change in capacitance (e.g., where touch input event 130) occurs compared to the accuracy within grid overlap area 625.

To address and improve the accuracy in determining a location of touch input event 130 in touchscreen device 110 with non-orthogonal electrodes, some embodiments scale the electrode geometries including pitches in a manner that preserves arbitrary areas (e.g., overlap area, grid overlap area) and hence the Cm accuracy.

FIG. 6C illustrates an example an XU non-orthogonal pattern 650 with grid overlap area 665 with U-scaling, according to an exemplary embodiment of the disclosure. Px and Py represent the pitches in the XY orthogonal pattern 600. Note that Pu(θ) is the pitch of a U-sense electrode with U-scaling that is a function of θ 660. In this U-scaled example, Pu(θ)=Py·sin θ, and Px=Px. As an example, θ 660=45°, but other values of θ 660<90° are possible. Grid overlap area 665 can be determined using pitches Px 653, Pu 655, and θ, and is determined as Px·Pu(1/sin θ) which is equivalent to Px·Py. Thus, an arbitrary area, grid overlap area 625, is preserved in grid overlap area 665 based at least on U-scaling. The reciprocal of the grid overlap area 665 corresponds to the density of the Cm overlaps on touchscreen device 110. Because grid overlap area 665 is equal to grid overlap area 625, the distances between the intersections and thus, the measurement error for grid overlap area 665 measurements 150 can be equivalent to the measurement error for grid overlap area 625 measurements. Accordingly, the accuracy in determining where within grid overlap area 665 the change in capacitance (e.g., where touch input event 130) occurs can be at least equal to the accuracy within grid overlap area 625.

FIG. 6D illustrates an example an XU non-orthogonal pattern 670 with grid overlap area 685 with X-scaling, according to an exemplary embodiment of the disclosure. Px and Py represent the pitches in the XY orthogonal pattern 600. Note that Px(θ) is the pitch of an X-sense electrode with X-scaling that is a function of θ 680, which is different than Px, which is the pitch of an X electrode in the XY orthogonal pattern 600. In this X-scaled example, Px(θ)=Px·sin θ and Px=Px. As an example, θ 680=45°, but other values of θ 680<90° are possible. Grid overlap area 685 is determined using pitches Px 673, Pu 675, and θ, and is determined as Px·Pu(1/sin θ) which is equivalent to Px·Py. Thus, an arbitrary area, grid overlap area 625, is preserved in grid overlap area 685. The reciprocal of the grid overlap area 685 corresponds to the density of the Cm overlaps on touchscreen device 110. Because, grid overlap area 685 is equal to grid overlap area 625, the distances between the intersections and thus, the measurement error for grid overlap area 685 measurements 150 can be equivalent to the measurement error for grid overlap area 625 measurements. Accordingly, the accuracy in determining where within grid overlap area 685 the change in capacitance (e.g., where touch input event 130) occurs can be at least equal to the accuracy within grid overlap area 625.

Non-orthogonal electrode examples above describe non-orthogonal XU electrodes with diagonal U-drive electrodes and vertical X-sense electrodes. Non-orthogonal electrode examples can also include non-orthogonal VU electrodes with diagonal U-drive electrodes and diagonal V-sense electrodes that are not parallel to any of the sides (e.g., horizontal edge W165 or vertical edge H167) of the touch sensitive area 160.

FIG. 7 illustrates an example of non-orthogonal VU electrode pattern 700 with schematic lines only, according to an exemplary embodiment of the disclosure. Pattern 700 includes non-orthogonal VU electrodes and is illustrated in FIG. 7 only with schematic lines. Heavy solid lines represent the diagonal U-drive electrodes and heavy dashed lines represent the diagonal V-sense electrodes. The schematic line drawing may represent Manhattan, diamond, or other electrode patterns. Since the electrodes are non-orthogonal, θ 730 in this example is less than 90°. The VU electrode pattern can also characterized by an acute angle formed by a vertical edge (e.g., H 167) of touch sensitive area 160 and a V-sense electrode, φ 740. Respective electrode pitches are Pv 710 and Pu 720.

FIGS. 8C-8D illustrate VU geometry with scaling to preserve mutual capacitance (Cm) areas as well as the density of mutual capacitance measurements without touch sensitive area 160. As a convenience and not a limitation, FIGS. 8A-8D may be described with elements from previous figures. FIG. 8A illustrates an example an XY orthogonal pattern 800 with overlap area 825, according to an exemplary embodiment of the disclosure. The reciprocal of grid overlap area 825 corresponds to the density of the Cm overlaps on touchscreen device 110. Grid overlap area 825 is bounded by pitches Px 810 and Py 820, and is determined as Px times Py. Since the electrodes are orthogonal, θ 815 equals 90°. The density of Cm measurements within touch sensitive area 160, or equivalently the Cm of grid overlap area 825, can be used to control the accuracy of the XY measurements and the determination of the location of a touch input event. Cm measured at the intersections of the schematic lines can be used to determine the distance of a touch input event from the nearest intersections and hence the location of a touch input event on a touchscreen device with XY orthogonal pattern 800.

FIG. 8B illustrates an example a VU non-orthogonal pattern 830 with unscaled grid overlap area 845, according to an exemplary embodiment of the disclosure. Px and Py represent the pitches in the XY orthogonal pattern 800. In this unscaled example, Pu=Py and Pv=Px. Grid overlap area 845 is determined by pitches Pv 833, Pu 835 and θ, and is determined as Pv·Pu(1/sin θ) which is equivalent to Px·Py (1/sin θ). As an example, θ 840=45°, but other values of θ 840<90° are possible. In this example, acute angle formed by vertical edge (e.g., H 167) of touch sensitive area 160 and a V-sense electrode, φ 843, equals 15°. Other values of φ 843 less than arctan(W/(2H)) are possible, where touch sensitive area 160 is a rectangular area with vertical edge, H 167, and horizontal edge, W 165. The reciprocal of the grid overlap area 845 corresponds to the density of the Cm overlaps on touchscreen device 110. Cm measured at the intersections of the schematic lines can be used to determine the distance of touch input event from the nearest intersections and hence the location of a touch input event on touchscreen device. Notice that there can be less intersections between U-drive electrodes and V-sense electrodes compared to the intersections of orthogonal pattern 800. Further, grid overlap area 845 is generally larger than grid overlap area 825, and the distances between the intersections increase. Thus, the measurement error for grid overlap area 845 measurements can be larger compared to the measurement error for grid overlap area 825 measurements. Accordingly, there can be less accuracy in determining where within grid overlap area 845 the change in capacitance (e.g., where touch input event) occurs compared to the accuracy within grid overlap area 825.

To address and improve the accuracy in determining a location of touch input event 130 in touchscreen device 110 with non-orthogonal VU electrodes, some embodiments scale the pitches in a manner that preserves arbitrary areas (e.g., overlap area, grid overlap area) and hence the Cm accuracy.

FIG. 8C illustrates an example a VU non-orthogonal pattern 850 with grid overlap area 865 with U-scaling, according to an exemplary embodiment of the disclosure. Px and Py represent the pitches in the XY orthogonal pattern 800. Note that Pu(θ) is the pitch of a U-sense electrode with U-scaling that is a function of θ 860. In this U-scaled example, Pu(θ)=Py·sin θ and Pv=Px. As an example, θ 860 equals 45°, but other values of θ 860 less than 90° are possible. In this example, the acute angle formed by vertical edge (e.g., H 167) of touch sensitive area 160 and a V-sense electrode, φ 863, equals 15°. Other values of φ 863<arctan (W/(2H) are possible, where touch sensitive area 160 is a rectangular area with vertical edge, H 167, and horizontal edge, W 165. Grid overlap area 865 can be determined by pitches Pv 853, Pu 855, and θ, and is determined as Pv·Pu(1/sin θ) which is equivalent to Px·Py. Thus, an arbitrary area, grid overlap area 825, is preserved in grid overlap area 865 based at least on U-scaling. The reciprocal of the grid overlap area 865 corresponds to the density of the Cm overlaps on touchscreen device 110. Because, grid overlap area 865 is equal to overlap area 825, the distances between the intersections and thus, the measurement error for grid overlap area 865 measurements 150 can be equivalent to the measurement error for grid overlap area 825 measurements. Accordingly, the accuracy in determining where within grid overlap area 865 the change in capacitance (e.g., where touch input event 130) occurs can be at least equal to the accuracy within grid overlap area 825.

FIG. 8D illustrates an example a VU non-orthogonal pattern 870 with grid overlap area 885 with V-scaling, according to an exemplary embodiment of the disclosure. Px and Py represent the pitches in the XY orthogonal pattern 800. Note that Pv(θ) is the pitch of a V-sense electrode with V-scaling that is a function of θ 880, which is different than Px, which is the pitch of an X electrode in the XY orthogonal pattern 600. In this V-scaled example, Pv(θ)=Px·sin θ and Pu=Py. As an example, θ 880 equals 45°, but other values of θ 880 less than 90° are possible. In this example, acute angle formed by vertical edge (e.g., H 167) of touch sensitive area 160 and a V-sense electrode, φ 883, equals 15°. But, other values of φ 883 less than arctan(W/(2H)) are possible, where touch sensitive area 160 is a rectangular area with vertical edge, H 167, and horizontal edge, W 165. Grid overlap area 885 can be determined by pitches Pv 873, Pu 875, and θ, and is determined as Pu·Pv(1/sin θ) which is equivalent to Px·Py. Thus, grid overlap area 825, is preserved in grid overlap area 885. The reciprocal of the grid overlap area 885 corresponds to the density of the Cm overlaps on touchscreen device 110. Because, grid overlap area 885 is equal to overlap area 825, the distances between the intersections and thus, the measurement error for grid overlap area 885 measurements 150 can be equivalent to the measurement error for grid overlap area 625 measurements. Accordingly, the accuracy in determining where within grid overlap area 885 the change in capacitance (e.g., where touch input event 130) occurs can be at least equal to the accuracy within grid overlap area 825.

The sensitivity of touchscreen device 110, for a given controller 120 and touch input event 130, can be represented by a SNR (Signal-to-Noise Ratio) proportionality equation as shown below:

$$SNR \propto \sqrt{\frac{1}{NumDriveChannels * \tau_{max}}} \quad \text{(Equation 1)}$$

where NumDriveChannels represents the number of drive channels provided by controller 120 to touchscreen device 110, and $\tau_{max}$ represents a drive-receive charge transfer path with the longest RC time constant. This $\tau_{max}$ can be represented by the longest path where a drive electrode intersects a receive electrode at an addressable measurable Cm. If the number of drive channels NumDriveChannels were increased, the amount of time per channel to signal average would decrease, thus reducing the SNR. By maintaining the same number of drive channels but decreasing $\tau_{max}$, the SNR and hence the sensitivity of touchscreen device 110 can be increased. The calculation of, and even the definition of, the RC time constant of a signal path in a PCAP touchscreen is a topic of some complexity. However, the RC time constant can be modeled as being a monotonically increasing function of the length of the drive-receive charge transfer path. It is sufficient to model the RC time constant as linearly proportional to the square length of the drive-receive charge transfer path. In the figures and in discussion further below, it is to be understood that "$\tau_{max}$" is to be understood as this model relative value of the RC time constant for the longest path. This modeled relative value of "$\tau_{max}$" is purely a function of touchscreen geometry and design and is unrelated to associated controller circuitry.

Figure 9B:
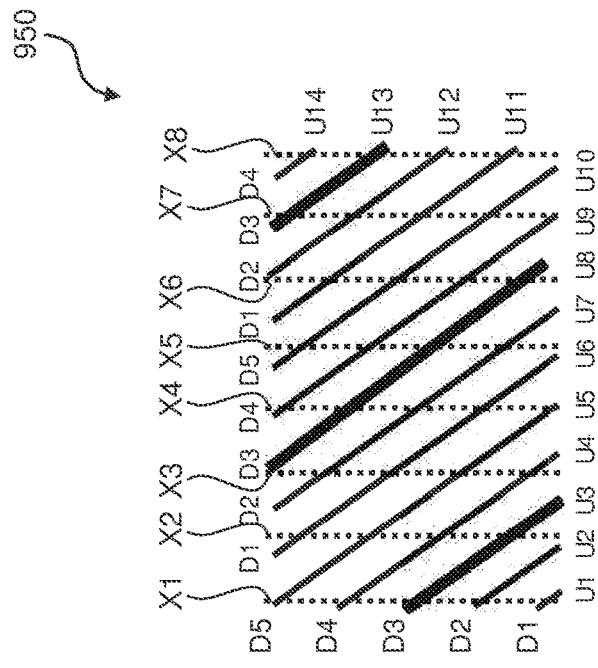
FIG. 9B illustrates an example of one-to-many mapping between drive channels and drive electrodes, according to an exemplary embodiment of the disclosure.
Figure 9A:
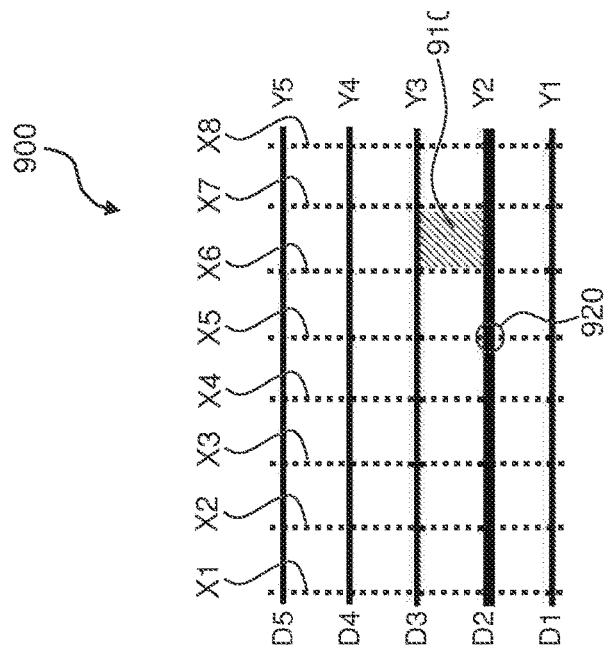
FIG. 9A illustrates an example of one-to-one mapping between drive channels and drive electrodes, according to an exemplary embodiment of the disclosure.

FIG. 9A illustrates example 900 of one-to-one mapping between drive channels (D) and Y-drive electrodes, according to an exemplary embodiment of the disclosure. Example 900 includes N drive channels, where N=5: D1-D5, and P Y-drive electrodes, where P=5: Y1-Y5. The Y-drive electrodes are physical electrodes of touch sensitive area of an equivalent sized touchscreen device with orthogonal electrodes. Example 900 also includes 8 X-sense electrodes: X1-X8. In example 900, when controller 120 transmits a drive signal on drive channel D2, only Y-drive electrode, Y2, (shown by a boldface line) will be excited. Any touch input event 130 that occurs along excited Y2 will be detected by respective X-sense electrodes, resulting in measurements 150 being received by controller 120. For example, if a touch at intersection 920, grid overlap area 910, or anywhere along Y2 is detected, the change in Cm will result in measurements 150 being received by controller 120 via a corresponding X-sense electrode. While example 900 illustrates an orthogonal XY pattern, some XU and/or VU non-orthogonal patterns can include a one-to-one mapping between drive channels (D) and U-drive electrodes.

FIG. 9B illustrates example 950 of one-to-many mapping between drive channels (D) and U-drive electrodes, according to an exemplary embodiment of the disclosure. Example 950 includes N drive channels, where N=5: D1-D5, that can be communicatively coupled to P physical U-drive electrodes of touch sensitive area 160, where P=14: U1-U14. Thus, even though using non-orthogonal electrodes increases the number of physical U-drive electrodes of touch sensitive area 160 to P, the number of drive channels, N, used by controller 120 does not increase. This is because multiple physical U-drive electrodes (e.g., a subset of P physical U-drive electrodes) can be communicatively coupled to the same drive channel, provided each physical U-drive of the subset of the physical U-drive electrodes intersects a mutually exclusive set of V-sense or X-sense electrodes.

Example 950 also includes 8 X-sense electrodes: X1-X8. In example 950, when controller 120 transmits a drive signal on drive channel D3, only U-drive electrodes U3, U8, and U13 (shown by a boldface lines) will be excited. The set of X-sense electrodes intersected by U3 is {X1; X2}. The set of X-sense electrodes intersected by U8 is {X3; X4; X5; X6}. The set of X-sense electrodes intersected by U13 is {X7; X8}. These are three mutually exclusive sets of X-sense electrodes (or V-sense electrodes for VU non-orthogonal patterns.) Thus, the subset of P U-drive electrodes communicatively coupled to one of the N drive channels intersect mutually exclusive sets of X-sense or V-sense electrodes.

The ability of touchscreen device 110 to detect touch input event 130 (e.g., the ability to detect changes to a capacitance in the grid) can be limited by the worst case touch performance of touch sensitive area 160, the overall resistance of the path that a charge transfer must take. In particular, touch sensitive area 160 sensitivity can be limited by the longest path traversed. Some embodiments include a touchscreen device with non-orthogonal electrodes where the longest path traversed is shorter than that of a touchscreen device with orthogonal electrodes. In other words, some embodiments include a touchscreen device with non-orthogonal electrodes with improved touch sensitivity where the signal time delay of the charge transfer path across a touchscreen device with non-orthogonal electrodes is less than the signal time delay of the charge transfer path across a touchscreen device with orthogonal electrodes.

Figure 10A:
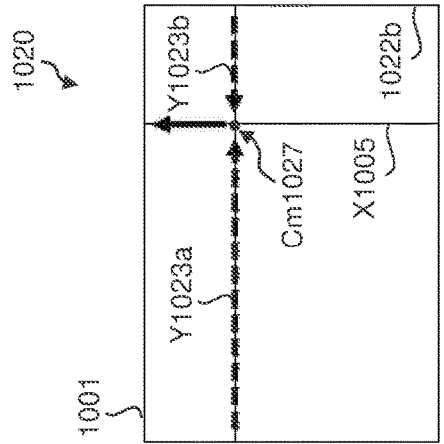
FIG. 10A illustrates a representative signal path example of a single-routing XY orthogonal pattern touchscreen device, according to an exemplary embodiment of the disclosure.

As a convenience and not a limitation, FIGS. 10A-10G may be described with elements of previous figures. FIG. 10A illustrates a representative signal path example 1000 of a single-routing XY orthogonal pattern touchscreen device, according to an exemplary embodiment of the disclosure. Unlike FIG. 9A, FIG. 10A shows one Y-drive electrode, Y1003, and one X-sense electrode, X1005, at the intersection of which is a mutual capacitance Cm1007 to be measured. Single-routing means that the electrodes in question are electrically coupled to controller 120 at one end only. This is in contrast to double-routing in which electrical connections to controller 120 are made to both ends of the electrodes in question. Y-drive electrode connections 1002 indicates that Controller 120 is electrically coupled to the Y electrodes at the left side of touch sensitive area 160 and X-sense electrode connections 1001 at the top indicates that controller 120 connects to the X electrodes at the top side of touch sensitive area 160. Controller 120 connects to drive electrode Y1003 via Y-drive electrode connections 1002 and controller 120 connects to sense electrode X1005 via X-sense electrode connections 1001 of touch sensitive area 160. As shown, the signal path enters from Y-drive electrode connections 1002 at the left of touch sensitive area 160, propagates horizontally along drive electrode Y1003 to the mutual capacitance Cm1007 to be measured, and then propagates vertically along sense electrode X1005 to X-sense electrode connections 1001 at the top edge of touch sensitive area 160. The total representative signal path length depends on the location of the mutual capacitance Cm1007 to be measured. Signal propagation is better modeled by a diffusion equation than a wave equation, and as a result signal propagation times tend to grow with the square of the signal path length.

Figure 10B:
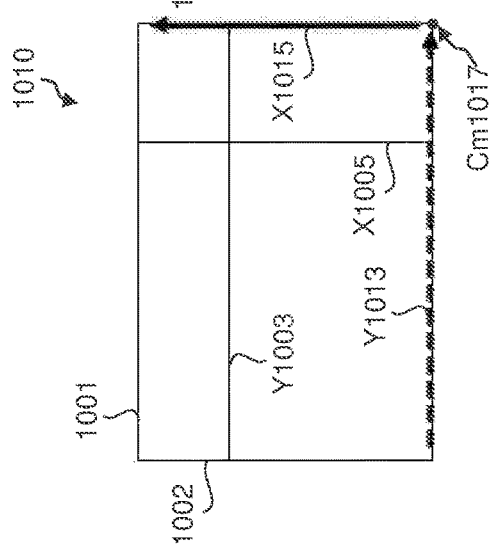
FIG. 10B illustrates a maximum length signal path example of a single-routing XY orthogonal pattern touchscreen device, according to an exemplary embodiment of the disclosure.

FIG. 10B is similar to FIG. 10A but rather than a representative signal path, a maximum length signal path is shown. FIG. 10B illustrates a maximum length path example 1010 of a single-routing XY orthogonal pattern touchscreen device, according to an exemplary embodiment of the disclosure. With Y-drive electrode connections 1002 at the left of touch sensitive area 160 and X-sense electrode connections 1001 at the top edge of touch sensitive area 160, mutual capacitance Cm1017 at the right lower corner corresponds to the maximum length signal path. The maximum length signal propagates from Y-drive electrode connections 1002, across Y-drive electrode Y1013 the full horizontal edge W165 of touch sensitive area 160 to reach the mutual capacitance Cm1017, and then propagates along X-sense electrode X1015 the full vertical edge H167 of touch sensitive area 160 to X-sense electrode connections 1001. The length of this maximal length signal path is horizontal edge W165 plus vertical edge H165, namely (W+H).

Figure 10C:
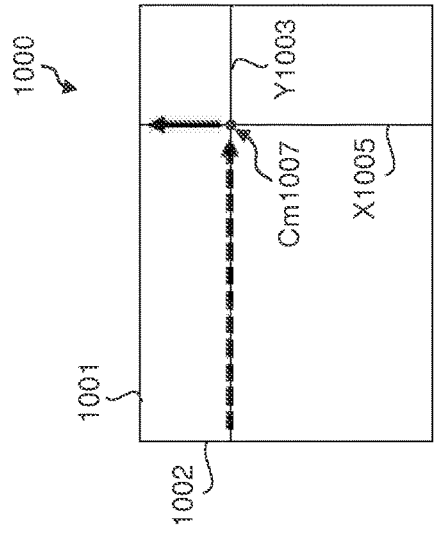
FIG. 10C illustrates a representative signal path example of a double-routing XY orthogonal pattern touchscreen device, according to an exemplary embodiment of the disclosure.

FIG. 10C is similar to FIG. 10A but the illustrated XY orthogonal pattern touchscreen device has double-routed Y-drive electrodes. FIG. 10C illustrates a representative signal path example 1020 of a double-routing XY orthogonal pattern touchscreen device, according to an exemplary embodiment of the disclosure. The double-routing is indicated in FIG. 10C by Y-drive electrode connections 1022a on the left side and 1022b on the right side of touch sensitive area 160 and X-sense electrode connections 1001 on the top edge of touch sensitive area 160. Excitation signals from controller 120 enter from both Y-drive electrode connections 1022a and 1022b of touch sensitive area 160 and propagate along drive electrode Y1023a and Y1023b to the mutual capacitance Cm1027 to be measured, before traversing sense electrode X1005 to X-sense electrode connections 1001. The shorter distance dominates the signal and is used to determine signal path lengths. As illustrated, the signal propagating from the right side, drive electrode Y1023b, dominates the signal propagating from drive electrode Y1023a.

Figure 10D:
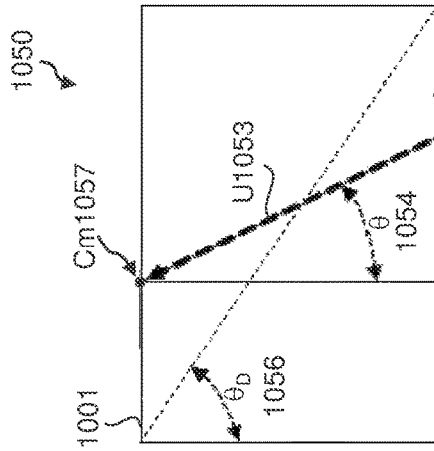
FIG. 10D illustrates a maximum length signal path example of a double-routing XY orthogonal pattern touchscreen device, according to an exemplary embodiment of the disclosure.

FIG. 10D is similar to FIG. 10C but instead of a representative signal path, a maximum length signal path is shown. FIG. 10D illustrates a maximum length signal path example 1030 of a double-routing XY orthogonal pattern touchscreen device, according to an exemplary embodiment of the disclosure. With Y-drive electrode connections 1022a on the left side and 1022b on the right side of touch sensitive area 160, and X-sense electrode connections 1001 on the top edge of touch sensitive area 160, mutual capacitance Cm1037 at the center bottom of touch sensitive area 160 has the maximum length signal path. From Y-drive electrode connections 1022a and 1022b, the drive electrode Y1033a on the left or Y1033b on the right side, the maximum length signal propagates across half horizontal edge W165 (W/2), of touch sensitive area 160 to reach the bottom center mutual capacitance CM1037 and then propagates along sense electrode X1035, the full vertical edge H167 (H) of touch sensitive area 160, to X-sense electrode connections 1001.

The length of this maximal length signal path is the half touch sensitive area 160 width, W/2, plus the touch area height H, namely (W/2+H).

While not shown in the figures, an XY orthogonal pattern touchscreen device may have double-routing for both X and Y electrodes. In some embodiments, the maximal path length is half touch sensitive area 160 width W/2 plus half the touch area height H/2, namely (W/2+H/2).

Figure 10E:
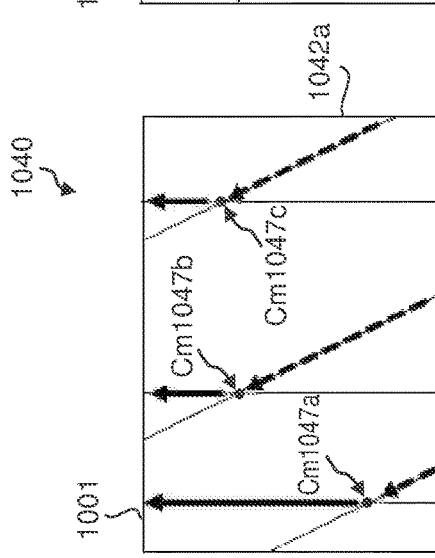
FIG. 10E illustrates a representative signal path example of a single-routing XU non-orthogonal pattern touchscreen device, according to an exemplary embodiment of the disclosure.

Like FIGS. 10A and 10C, FIG. 10E illustrates a representative signal path example 1040, but this time for a single-routing XU non-orthogonal pattern touchscreen device, according to an exemplary embodiment of the disclosure. Unlike FIG. 9B, only three example U electrodes and three example X electrodes are shown. In this example, both X and U electrodes are single routed. However, in order to make electrical connection to all U electrodes, U-drive electrode connections 1042a are on the right side of touch sensitive area 160 and U-drive electrode connections 1042b are along the bottom edge of touch sensitive area 160. X-sense electrode connections 1001 are on the top edge of touch sensitive area 160. Three representative signal paths are shown corresponding to mutual capacitances measured, Cm1047a-CM1047c. In two cases, Cm1047a and Cm1047b, the corresponding drive signals leave U-drive electrode connections 1042b and propagate along a corresponding U electrode to a corresponding mutual capacitance Cm1047a or Cm1047b to be measured. From there the corresponding signals propagate vertically along corresponding X sense electrodes to X-sense electrode connections 1001 at the top of touch sensitive area 160. A third representative signal path corresponding to Cm1047c measurement is similar but the driver signal enters from U-drive electrode connections 1042a. The total signal path length varies depending on the location of the mutual capacitance Cm1047a-CM1047c to be measured.

Figure 10F:
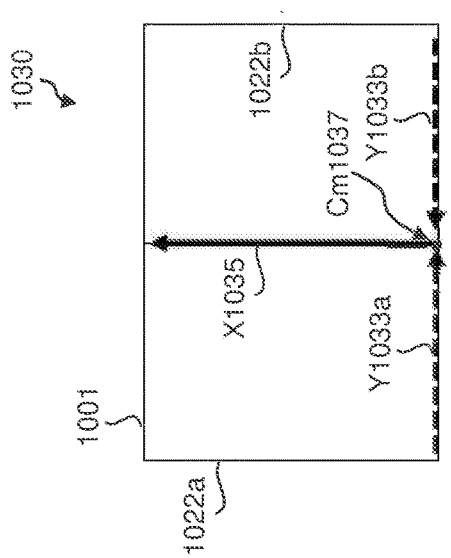
FIG. 10F illustrates a maximum length signal path example of a single-routing XU non-orthogonal pattern touchscreen device, according to an exemplary embodiment of the disclosure.

FIG. 10F is similar to FIG. 10E but instead of representative signal paths, an example of a maximum length signal path is shown. FIG. 10F illustrates a maximum length signal path example 1050 of a single-routing XU non-orthogonal pattern touchscreen device, according to an exemplary embodiment of the disclosure. In such maximal length signal paths, the drive signal enters a U-drive electrode U1053 from U-drive electrode connections 1042b along the bottom edge of touch sensitive area 160. A maximal length signal path does not encounter the mutual capacitance Cm1057 to be measured until the very top of touch sensitive area 160. For example, the mutual capacitance to be measured is at the top of touch sensitive area 160 where there is negligible vertical path length to reach the top edge of touch sensitive area 160. To a good approximation, the entire length of the maximum length signal path is along U-drive electrode U1053 and essentially none of the path length along an X sense electrode. Provided that θ 1054 is less than $\theta_D$ 1056, the resulting maximum length signal path is H/cos(θ).

While not shown in FIG. 10, in some embodiments the U-electrodes are double routed. In this case the maximum path length is ((H/2)/cos(θ)+H/2). This corresponds to the measurement of a mutual capacitance "Cm" at the center of touch sensitive area 160 in which the signal propagates a distance (H/2)/cos(θ) along a U-drive electrode and then a distance H/2 along an X-sense electrode. This maximum path length is the same whether the X-sense electrodes are single-routed or double-routed.

In some embodiments (not shown), it is preferable to avoid connecting to more than one set of electrodes on a given side of the touch area. An example is a modification of the sensor of FIG. 10F with double-routed U drive electrodes. For example, both X and U electrodes have connections at the top side of touch sensitive area 160. Care is be taken to avoid electronic cross-talk between U-drive and X-sense electrode connections (e.g., traces.) Accordingly, the border width of touchscreen 110 may be undesirably increased to make room for more traces and their electrical isolation. Touch sensitive areas 160 shown in FIGS. 10A through 10F avoid connecting to more than one electrode set on an edge.

Figure 10G:
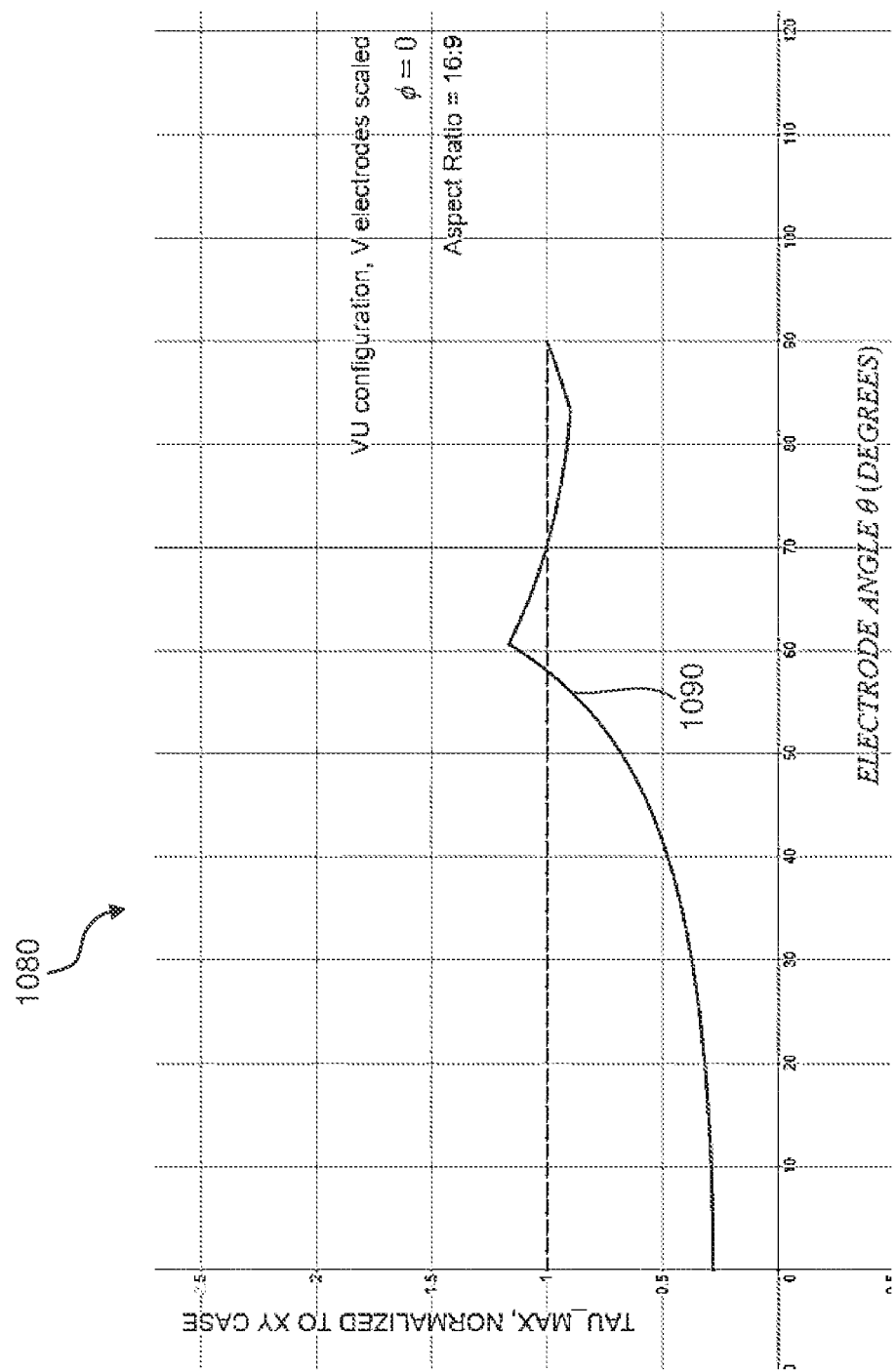
FIG. 10G illustrates a graph of $\tau_{max}$ of an XU non-orthogonal pattern touchscreen device as a function of $\theta$, according to an exemplary embodiment of the disclosure.

FIG. 10G illustrates a graph 1080 of $\tau_{max}$ of an XU non-orthogonal pattern touchscreen device as a function of θ, according to an exemplary embodiment of the disclosure. Again, $\tau_{max}$ represents a drive-receive charge transfer path with the longest RC time constant. In graph 1080, $\tau_{max}$ is normalized to XY orthogonal screen for touch sensitive area 160 with a 16:9 aspect ratio. Plot 1090 of the $\tau_{max}$ is not affected by U-drive or V/X-sense scaling. (The leftmost kink in plot 1090 corresponds to a value of θ equal to $\theta_D$.) Thus, for a given aspect ratio of touch sensitive area 160, as θ decreases from $\theta_D$, the $\tau_{max}$ decreases, and the sensitivity of touchscreen device 110 increases proportionally.

Some embodiments include a touchscreen system that includes a touchscreen device with U-drive electrodes and V-sense electrodes that intersect at an acute angle, θ, where the touchscreen device includes a rectangular touch sensitive area with horizontal edge of length W and a vertical edge of length H. A controller coupled to the touchscreen device can transmit drive signals via N drive channels, where N is an integer, and where the N drive channels are communicatively coupled to P U-drive electrodes. In some embodiments, P is an integer greater than or equal to N, and members of a subset of the P U-drive electrodes communicatively coupled to one of the N drive channels, each intersect mutually exclusive sets of the V-sense electrodes. Based on a value of θ, signals corresponding to the drive signals traverse path lengths that are less than W plus H. In some embodiments, the path lengths corresponding to the drive signals are less than H plus half of W. In some embodiments, the path lengths corresponding to the drive signals are less than half of H plus half of W.

Referring to FIG. 1, touchscreen 110 may include cabling (not shown), such as a flex cable, that facilitates electrical connection of drive channels 140 and measurement channels 150 between touchscreen 110 and controller 120. In some embodiments, the cabling may provide P traces to enable connection of U electrodes to controller 120. In this case, circuitry within controller 120 provides electrical connections to map the larger number of P U-drive electrodes to the smaller number of N drive channels. In some embodiments, the cabling itself, and hence touchscreen 110, electrically connects U-drive electrodes as needed to make the larger number of P U-drive electrodes to the smaller number of N drive channels. In this case, the number of drive channels "N" is determined by the touchscreen cabling. In some embodiments, the controller 120 circuitry is integrated onto the cabling, or onto the touchscreen 110 directly.

Some embodiments include a method of fabrication that includes providing a first and second transparent substrate surfaces aligned in a rectangular shape with vertical edge, H, and horizontal edge, W, with an acute angle, $\theta_D$, between the vertical edge, H, and a diagonal line of the rectangular shape. The method includes disposing first electrode patterns on the first transparent substrate surface using a fabrication process, where the first electrode patterns include U-drive electrodes, and disposing second electrode patterns on the second transparent substrate surface using the fabrication process, where the second electrode patterns include V-sense electrodes that are non-orthogonal to the U-drive electrodes. The V-sense electrodes intersect the U-drive electrodes at an acute angle, θ, and the V-sense electrodes intersect the vertical edge at an acute angle, φ, where $0<\varphi<\arctan(W/2H)$ and $0<\theta<(\varphi+\theta_D)$.

Figures 11A, 11B:
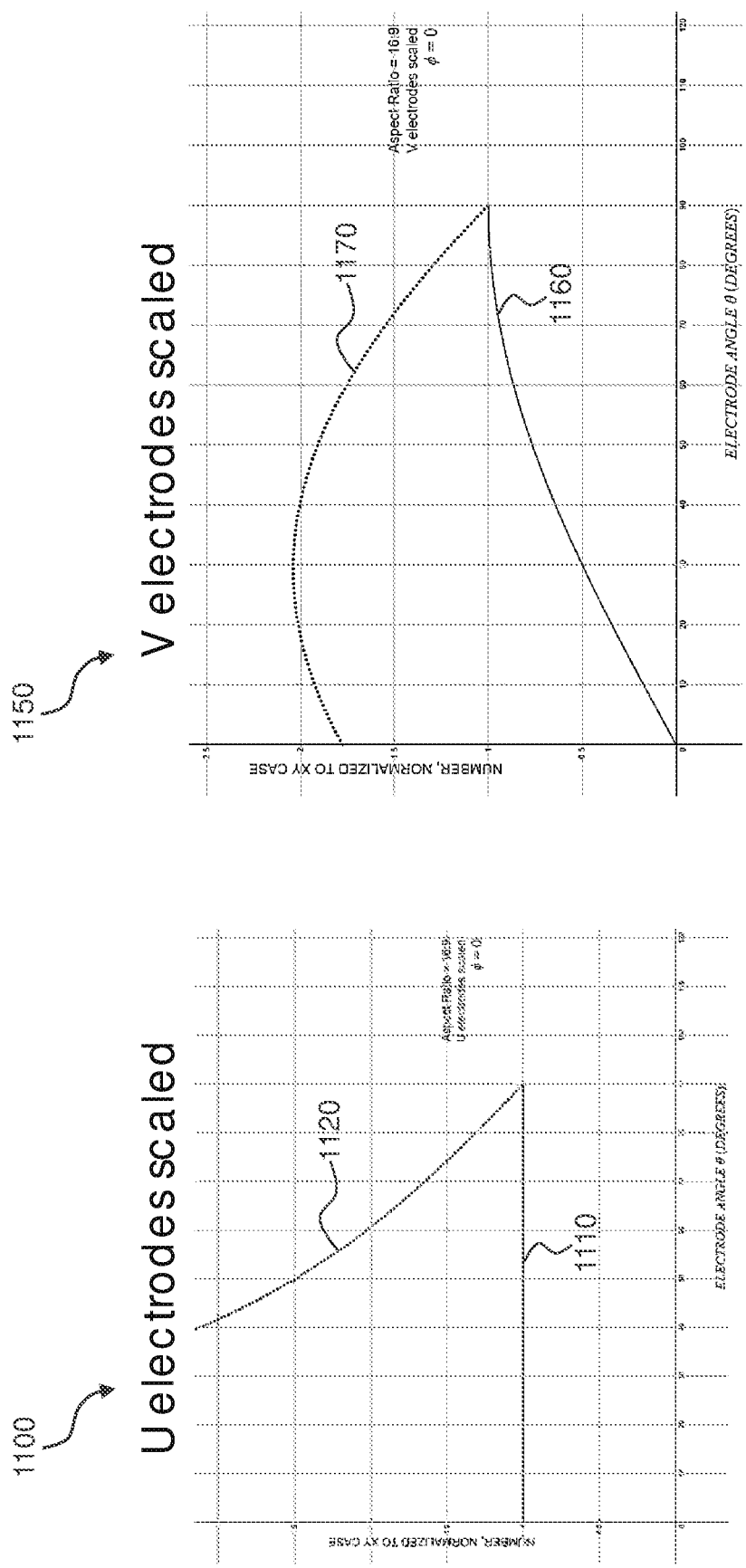
FIG. 11A illustrates an example of a number of drive channels and drive electrodes as a function of $\theta$, of a touchscreen device with an non-orthogonal pattern touchscreen device with U-scaling, according to an exemplary embodiment of the disclosure.
FIG. 11B illustrates an example of a number of drive channels and drive electrodes as a function of $\theta$, of an non-orthogonal pattern touchscreen device with V-scaling, according to an exemplary embodiment of the disclosure.

FIG. 11A illustrates example 1100 of a number of drive channels, N, and U-drive electrodes, P, as a function of θ, of a touchscreen device 110 with an non-orthogonal XU pattern touchscreen device with U-scaling, according to an exemplary embodiment of the disclosure. Dashed line 1120 represents the number of physical U-drive electrodes, P, on touch sensitive area 160. Solid line 1110 represents the number of drive channels, N, needed by controller 120, where N is normalized to the orthogonal XY pattern. When scaling U-drive electrodes to preserve the same Cm geometry as an XY orthogonal pattern, as θ decreases the U-drive electrodes are scaled and become tighter, closer together. Accordingly, the number of U-drive electrodes, P, increases. Notice however, that the number of drive channels, N, remains constant as shown by solid line 1110. As illustrated in graph 1080 of FIG. 10C, as θ decreases from $\theta_D$, $\tau_{max}$ decreases, and the sensitivity of touchscreen device 110 increases. Accordingly as described in Equation 1, the sensitivity of touch sensitive area 160 of touchscreen device 110 can be increased by implementing non-orthogonal electrodes and varying the value of θ. As θ decreases from $\theta_D$, the $\tau_{max}$ decreases, sensitivity increases, yet the number of drive channels, N, remains the same.

FIG. 11B illustrates example 1150 of a number of drive channels, N, and U-drive electrodes, P, as a function of θ, of an non-orthogonal XU pattern touchscreen device with V-scaling, according to an exemplary embodiment of the disclosure. Since $\varphi=0°$, V-sense electrodes are equal to vertical X-sense electrodes. Dashed line 1170 represents the number of physical U-drive electrodes, P, on touch sensitive area 160. Solid line 1160 represents the number of drive channels, N, needed by controller 120. As described in Equation 1, the sensitivity of touch sensitive area 160 of touchscreen device 110 can be increased by implementing non-orthogonal electrodes and varying the value of θ. As θ decreases from $\theta_D$, the $\tau_{max}$ decreases, and sensitivity increases. In contrast to Example 1100, when scaling V-sense electrodes, the number of drive channels, N, required decreases as θ decreases.

Area-conserving shear linear transformations can scale U-drive and/or V-sense electrodes. For example, equations mapping orthogonal X/Y electrode geometry to non-orthogonal X/U electrode geometry can be applied:

$$y \rightarrow y' = y - \cot(\theta) \cdot x$$

$$x \rightarrow x' = x$$

The same equations are shown in matrix form below:

$$\begin{pmatrix} x \\ y \end{pmatrix} \rightarrow \begin{pmatrix} x' \\ y' \end{pmatrix} = \begin{pmatrix} 1 & 0 \\ -\cot(\theta) & 1 \end{pmatrix} \begin{pmatrix} x \\ y \end{pmatrix}$$

Determinant of one means mapping conserves area:

$$\det \begin{pmatrix} 1 & 0 \\ -\cot(\theta) & 1 \end{pmatrix} = 1$$

U-drive electrodes measure a 'u' coordinate from which touch y coordinates can be reconstructed:

$$u = \cos(\theta) \cdot x + \sin(\theta) \cdot y$$

$$y = \frac{1}{\sin(\theta)} (u - \cos(\theta) \cdot x)$$

Applying area-conserving shear linear transformation to FIG. 6A yields FIG. 6C. Applying Equation 1 to FIG. 6C yields the following estimated relative SNR shown in FIG. 12:

$$\text{SNR for } \theta < \theta_D = \left(1 + \frac{R}{2}\right) \cos(\theta)$$

Figure 12:
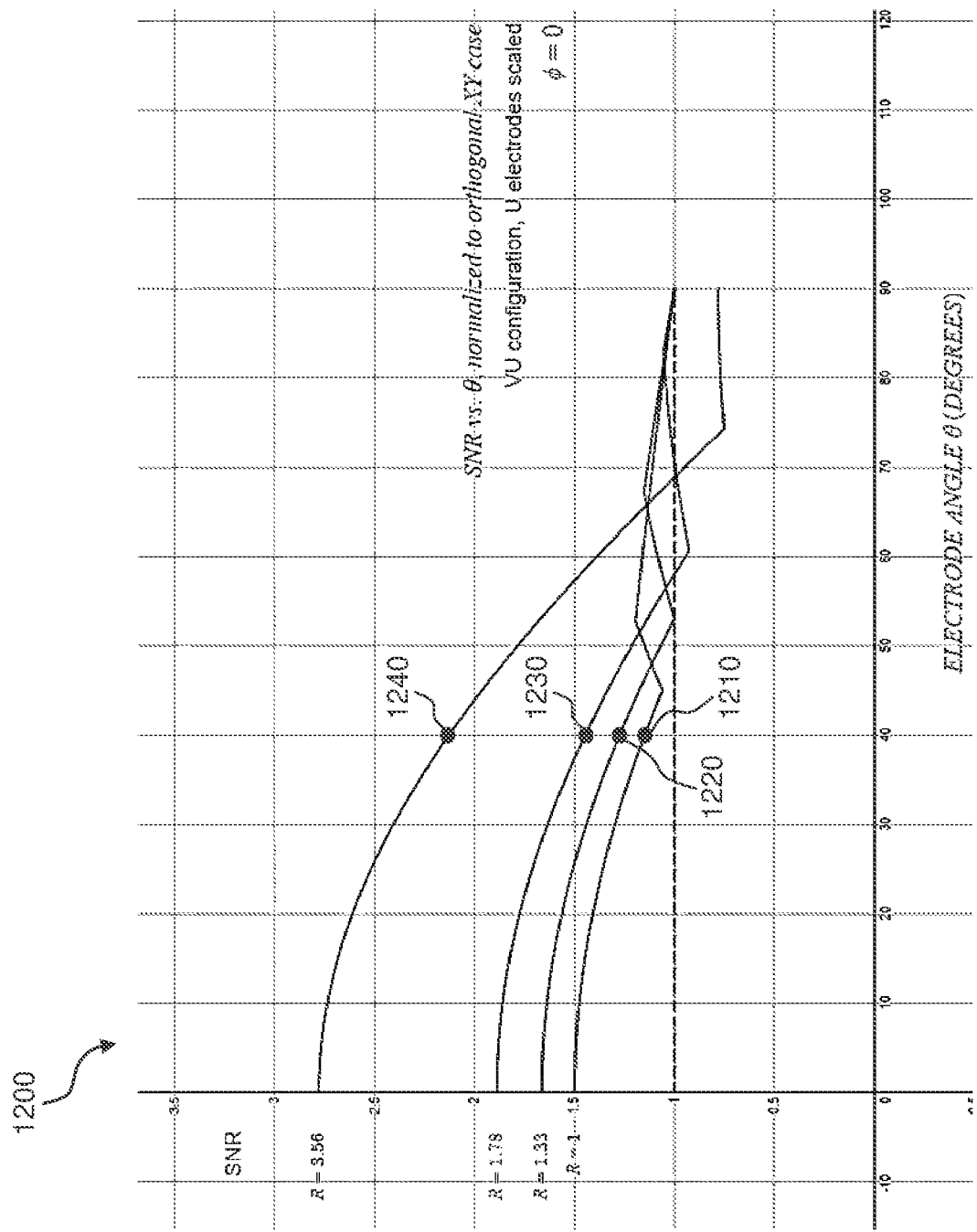
FIG. 12 illustrates an example of signal to noise ratio (SNR) as a function of $\theta$ for different aspect ratios, of an XU non-orthogonal pattern touchscreen device with U-scaling, according to an exemplary embodiment of the disclosure.

FIG. 12 illustrates example 1200 of SNR as a function of θ for different aspect ratios, of an XU non-orthogonal pattern touchscreen device with U-scaling, according to an exemplary embodiment of the disclosure. SNR=1 is the SNR of an XY orthogonal electrode pattern. Thus, an SNR value>1 is an improvement over the XY orthogonal electrode pattern.

Example aspect ratios for touch sensitive area 160 are shown on example 1200:

$$R = 32:9 = 32/9 = 3.56$$

$$R = 16:9 = 16/9 = 1.78$$

$$R = 4:3 = 4/3 = 1.33$$

$$R = 1:1 = 1$$

Example 1200 illustrates that as an aspect ratio, R, increases, for a given value of $\theta<\theta_D$, the maximum SNR increases. (For each aspect ratio R, the corresponding value of $\theta_D$ corresponds to the leftmost kink in the corresponding curve.) For example, when θ=40°, SNR for R=1 at point 1210 is 1.2 or 20% better than the SNR of touch sensitive area 160 with the XY orthogonal electrode pattern. At θ=40°, SNR for R=1.33 at point 1220 is 1.3; SNR for R=1.78 at point 1230 is 1.4; SNR for R=3.56 at point 1240 is 2.2 or 120% better than the SNR of touch sensitive area 160 with the XY orthogonal electrode pattern. Further, as an aspect ratio increases, the range of θ yielding an SNR improvement increases. For example, for R=3.56 the range of θ where the SNR is >1 is θ<68° which is larger than any of the other aspect ratios shown.

In some embodiments, a SNR quantity $$\left(1 + \frac{R}{2}\right) \cos(\theta)$$

is greater than one, where aspect ratio, R, equals $\tan(\theta_D)$. This SNR quantity is determined by the geometry and design of the touchscreen. The adjective "SNR" in "SNR quantity" is motivated by its relevance to achieving improved electronic signal-to-noise ratio and hence improved touch sensitivity. Nevertheless, no electronics is involved in the definition and measurement of this "SNR quantity".

Applying another area-conserving shear linear transformation to FIG. 6A yields FIG. 6D. Applying Equation 1 to FIG. 6D yields the following estimated relative SNR shown in FIG. 13:

$$SNR \text{ for } \theta < \theta_D = \left(1 + \frac{R}{2}\right)\cos(\theta)\sqrt{\frac{1}{\sin\theta}}$$

Figure 13:
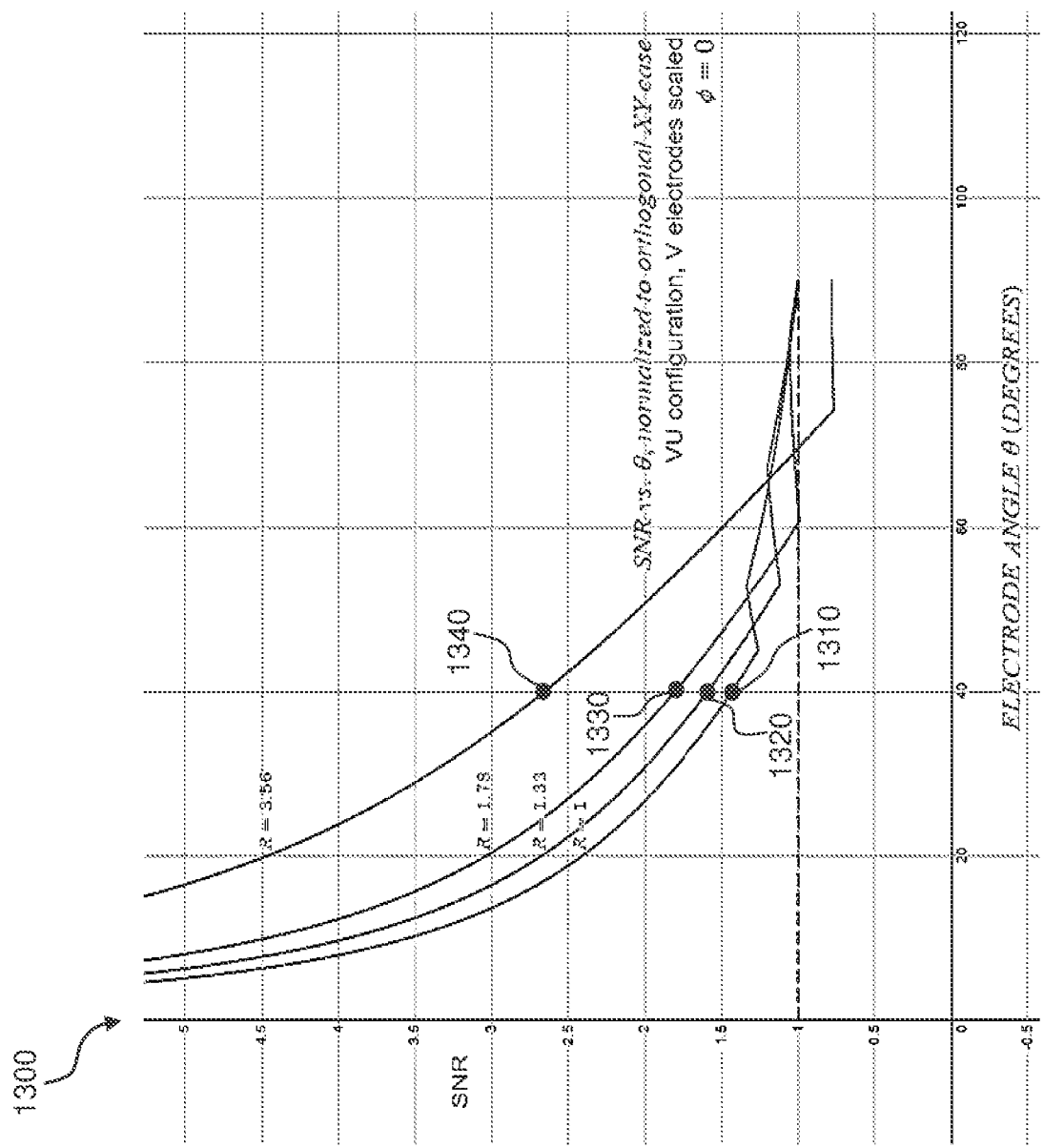
FIG. 13 illustrates an example of SNR as a function of $\theta$ for different aspect ratios, of an XU non-orthogonal pattern touchscreen device with X-scaling, according to an exemplary embodiment of the disclosure.

FIG. 13 illustrates example 1300 of SNR as a function of $\theta$ for different aspect ratios, of an XU non-orthogonal pattern touchscreen device with X-scaling, according to an exemplary embodiment of the disclosure. SNR=1 is the SNR of an XY orthogonal electrode pattern. Thus, an SNR value>1 is an improvement over the XY orthogonal electrode pattern. Example 1300 illustrates that as an aspect ratio, R, increases, for a given value of $\theta<\theta_D$, the maximum SNR increases. (For each aspect ratio R, the corresponding value of $\theta_D$ corresponds to the leftmost kink in the corresponding curve.) For example, when $\theta=40°$, SNR for R=1 at point 1310 is 1.4 or 40% better than the SNR of touch sensitive area 160 with the XY orthogonal electrode pattern. At $\theta=40°$, SNR for R=1.33 at point 1320 is 1.6; SNR for R=1.78 at point 1330 is 1.8; SNR for R=3.56 at point 1340 is 2.7 or 170% better than the SNR of touch sensitive area 160 with the XY orthogonal electrode pattern. Further, as an aspect ratio increases, the range of $\theta$ yielding an SNR improvement increases. For example, for R=3.56 the range of $\theta$ where the SNR is >1 is $\theta<65°$ which is larger than any of the other aspect ratios shown. Also, the amount of SNR for given $\theta$ is improved by a factor of $1/\sqrt{\sin(\theta)}$ compared to U-scaling. This is due to the fact that fewer drive channels, N, are required when scaling V. Recall from example 1150 of FIG. 11B, scaling V-sense electrodes can decrease the number of drive channels, N, and provides greater improvements on the drive channels.

In some embodiments, an SNR quantity $$\left(1 + \frac{R}{2}\right)\cos(\theta)\sqrt{\frac{1}{\sin\theta}}$$

is greater than one, wherein aspect ratio, R, equals tan $(\theta_D)$. Again, this SNR quantity is determined by the geometry and design of the touchscreen.

Applying an area-conserving shear linear transformation to FIG. 8A yields FIG. 8C. Applying Equation 1 to FIG. 8C yields the following estimated relative SNR shown in FIGS. 14A and 14B:

$$SNR \text{ for } \theta < \phi + \theta_D = \sqrt{\frac{\left(1+\frac{R}{2}\right)^2 \cos\phi}{\max\left(\frac{1}{\cos^2\phi}, \frac{1}{\cos^2(\theta-\phi)}\right)}}$$

Figure 14A:
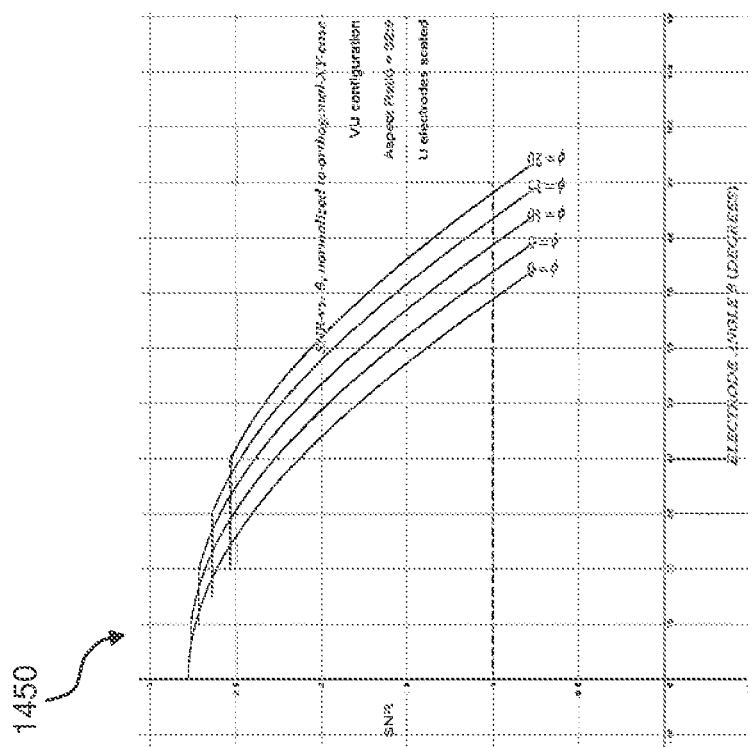
FIG. 14A illustrates an example of SNR as a function of $\theta$ for different values of $\varphi$, of a VU non-orthogonal pattern touchscreen device with U-scaling with an aspect ratio of 16:9, according to an exemplary embodiment of the disclosure.

FIG. 14A illustrates example 1400 of SNR as a function of $\theta$ for different values of $\varphi$, of a VU non-orthogonal pattern touchscreen device with U-scaling with an aspect ratio of 16:9, according to an exemplary embodiment of the disclosure. Different values of $\varphi$ are shown at 0°, 5°, 10°, 15°, and 20°. Other values of $\varphi$ are possible. As shown, for a given value of $\theta$, SNR can be improved by careful selection of values of $\varphi$.

Figure 14B:
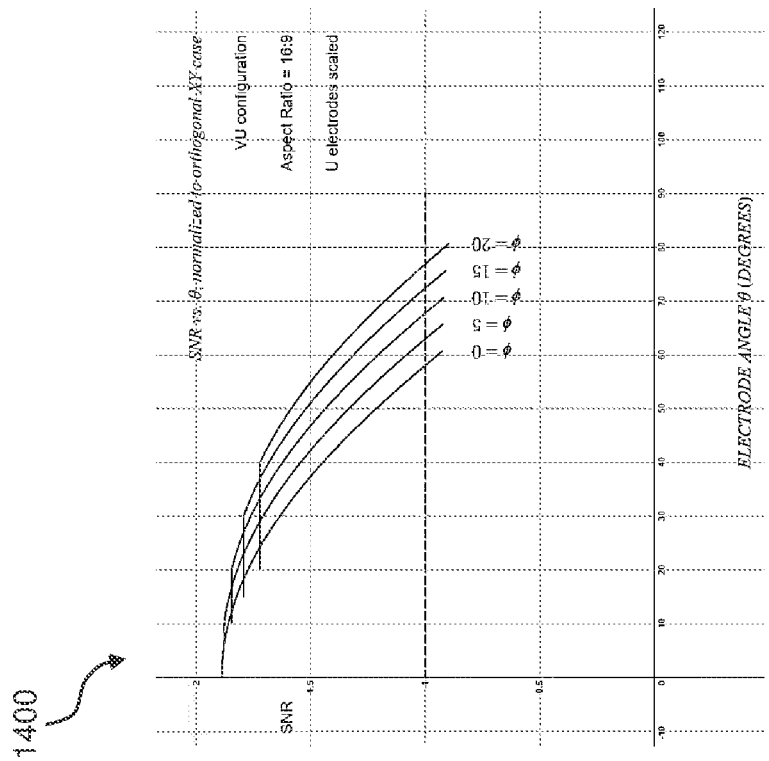
FIG. 14B illustrates an example of SNR as a function of $\theta$ for different values of $\varphi$, of a VU non-orthogonal pattern touchscreen device with U-scaling with an aspect ratio of 32:9, according to an exemplary embodiment of the disclosure.

FIG. 14B illustrates example 1450 of SNR as a function of $\theta$ for different values of $\varphi$, of a VU non-orthogonal pattern touchscreen device with U-scaling with an aspect ratio of 32:9, according to an exemplary embodiment of the disclosure. Different values of $\varphi$ are shown at 0°, 5°, 10°, 15°, and 20°. Other values of $\varphi$ are possible. As shown, for a given value of $\theta$, SNR can be improved by careful selection of values of $\varphi$.

In some embodiments, an SNR quantity $$SNR \text{ for } \theta < \phi + \theta_D = \sqrt{\frac{\left(1+\frac{R}{2}\right)^2 \cos\phi}{\max\left(\frac{1}{\cos^2\phi}, \frac{1}{\cos^2(\theta-\phi)}\right)}}$$

is greater than one, wherein aspect ratio, R, equals tan $(\theta_D)$.

Applying an area-conserving shear linear transformation to FIG. 8A yields FIG. 8D. Applying Equation 1 to FIG. 8D yields the following estimate relative SNR shown in FIGS. 15A and 15B:

$$SNR \text{ for } \theta < \phi + \theta_D = \sqrt{\frac{\left(1+\frac{R}{2}\right)^2 \cos\phi}{\sin\theta \max\left(\frac{1}{\cos^2\phi}, \frac{1}{\cos^2(\theta-\phi)}\right)}}$$

Figure 15A:
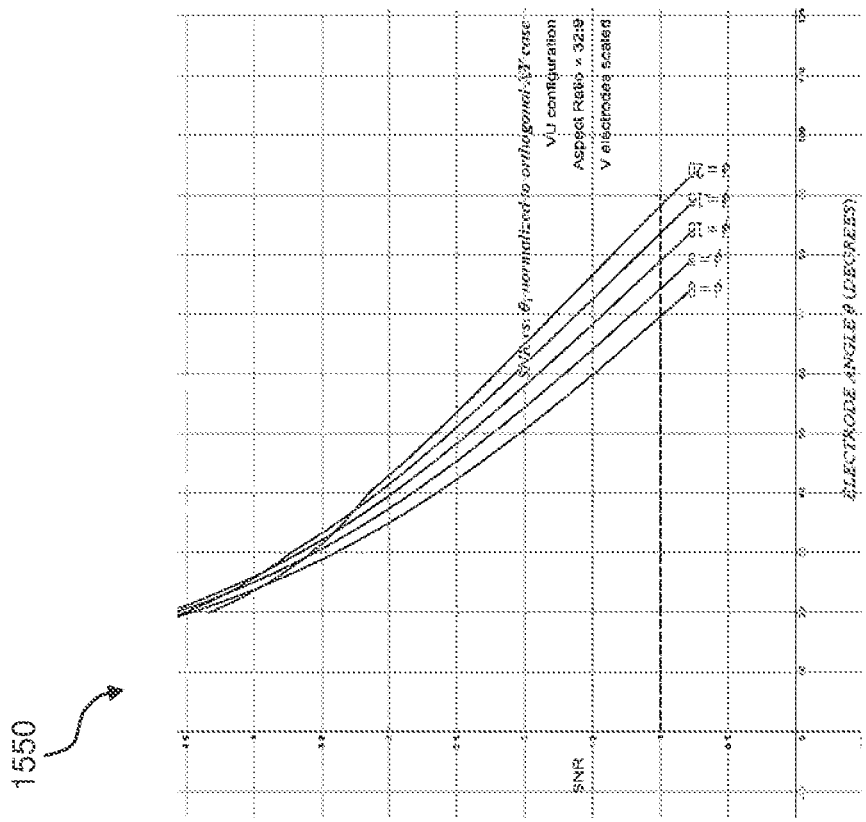
FIG. 15A illustrates an example of SNR as a function of $\theta$ for different values of $\varphi$, of a VU non-orthogonal pattern touchscreen device with V-scaling with an aspect ratio of 16:9, according to an exemplary embodiment of the disclosure.
Figure 16:
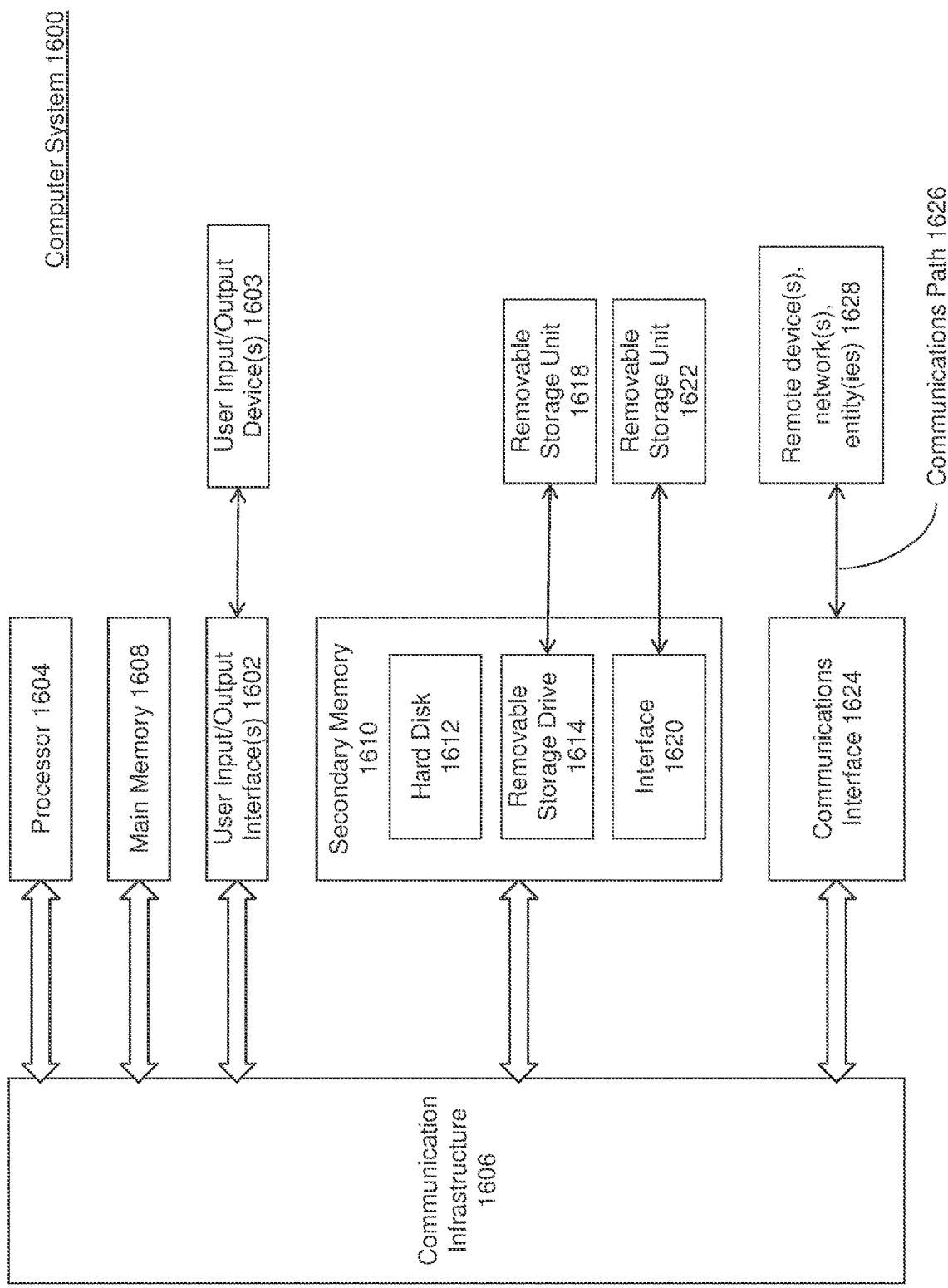
FIG. 16 illustrates an example computer system useful for implementing and/or using various embodiments.

FIG. 15A illustrates example 1500 of SNR as a function of $\theta$ for different values of $\varphi$, of a VU non-orthogonal pattern touchscreen device with V-scaling with an aspect ratio of 16:9, according to an exemplary embodiment of the disclosure. Different values of $\varphi$ are shown at 0°, 5°, 10°, 15°, and 20°. Other values of $\varphi$ are possible. As shown, for a given value of $\theta$, SNR can be improved by careful selection of values of $\varphi$.

Figure 15B:
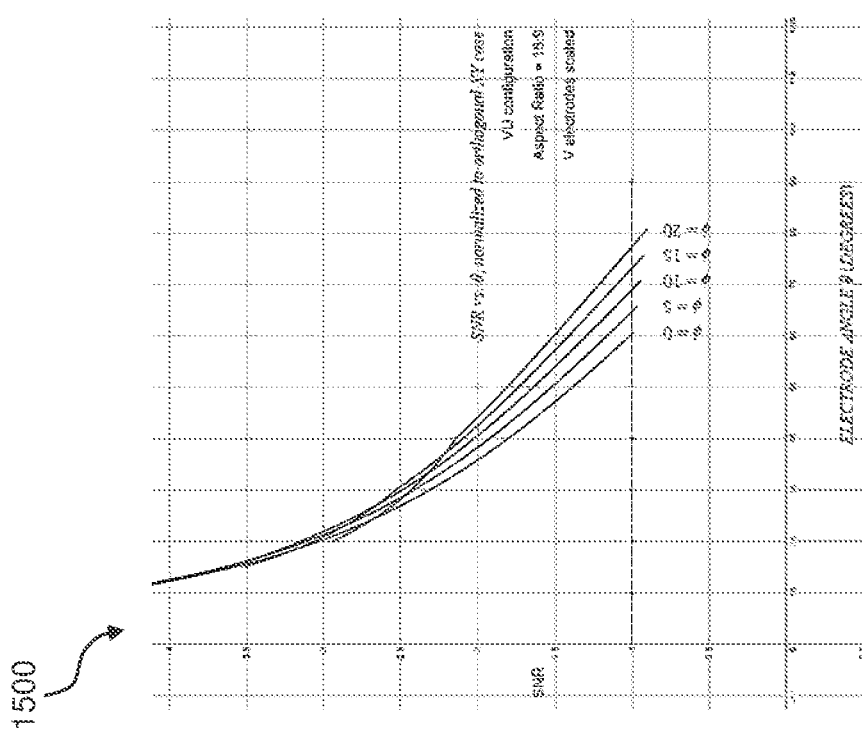
FIG. 15B illustrates an example of SNR as a function of $\theta$ for different values of $\varphi$, of a VU non-orthogonal pattern touchscreen device with V-scaling with an aspect ratio of 32:9, according to an exemplary embodiment of the disclosure.

FIG. 15B illustrates example 1550 of SNR as a function of $\theta$ for different values of $\varphi$, of a VU non-orthogonal pattern touchscreen device with V-scaling with an aspect ratio of 32:9, according to an exemplary embodiment of the disclosure. Different values of $\varphi$ are shown at 0°, 5°, 10°, 15°, and 20°. Other values of $\varphi$ are possible. As shown, for a given value of $\theta$, SNR can be improved by careful selection of values of $\varphi$.

In some embodiments, an SNR quantity $$SNR \text{ for } \theta < \phi + \theta_D = \sqrt{\frac{\left(1+\frac{R}{2}\right)^2 \cos\phi}{\sin\theta \max\left(\frac{1}{\cos^2\phi}, \frac{1}{\cos^2(\theta-\phi)}\right)}}$$

is greater than one, wherein aspect ratio, R, equals tan $(\theta_D)$.

Various embodiments can be implemented, for example, using one or more well-known computer systems, such as computer system 1600 shown in FIG. 16. Computer system 1600 can be any well-known computer capable of performing the functions described herein such as touchscreen device 110 and/or controller 120.

Computer system 1600 includes one or more processors (also called central processing units, or CPUs), such as a processor 1604. Processor 1604 is connected to communication infrastructure 1606 (e.g., a bus). One or more processors 1604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc. Computer system 1600 also includes user input/output device(s) such as monitors, keyboards, pointing devices, etc., that communicate with communication infrastructure 1606 through user input/output interface(s) 1602.

Computer system 1600 also includes a main or primary memory 1608, such as random access memory (RAM). Main memory 1608 may include one or more levels of cache. Main memory 1608 has stored therein control logic (i.e., computer software) and/or data. Computer system 1600 may also include one or more secondary storage devices or memory 1610. Secondary memory 1610 may include, for example, a hard disk drive 1612 and/or a removable storage device or drive 1614. Removable storage drive 1614 may be a floppy disk drive, a magnetic tape drive, a compact disk drive, an optical storage device, tape backup device, and/or any other storage device/drive.

Removable storage drive 1614 may interact with a removable storage unit 1618. Removable storage unit 1618 includes a computer usable or readable storage device having stored thereon computer software (control logic) and/or data. Removable storage unit 1618 may be a floppy disk, magnetic tape, compact disk, DVD, optical storage disk, and/any other computer data storage device. Removable storage drive 1614 reads from and/or writes to removable storage unit 1618 in a well-known manner.

According to an exemplary embodiment, secondary memory 1610 may include other means, instrumentalities or other approaches for allowing computer programs and/or other instructions and/or data to be accessed by computer system 1600. Such means, instrumentalities or other approaches may include, for example, a removable storage unit 1622 and an interface 1620. Examples of the removable storage unit 1622 and the interface 1620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1600 may further include a communication or network interface 1624. Communication interface 1624 enables computer system 1600 to communicate and interact with any combination of remote devices, remote networks, remote entities, etc. (individually and collectively referenced by reference number 1628). For example, communication interface 1624 may allow computer system 1600 to communicate with remote devices 1628 over communications path 1626, which may be wired, and/or wireless, and which may include any combination of LANs, WANs, the Internet, etc. Control logic and/or data may be transmitted to and from computer system 1600 via communication path 1626.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 1600, main memory 1608, secondary memory 1610, and removable storage units 1618 and 1622, as well as tangible articles of manufacture embodying any combination of the foregoing. Such control logic, when executed by one or more data processing devices (such as computer system 1600), causes such data processing devices to operate as described herein.

The foregoing description, for purposes of explanation, used specific nomenclature to provide a thorough understanding of the disclosure. However, it will be apparent to one skilled in the art that specific details are not required in order to practice the disclosure. Thus, the foregoing descriptions of specific embodiments of the disclosure are presented for purposes of illustration and description. They are not intended to be exhaustive or to limit the disclosure to the precise forms disclosed; obviously, many modifications and variations are possible in view of the above teachings. The embodiments were chosen and described in order to best explain the principles of the disclosure and its practical applications, they thereby enable others skilled in the art to best utilize the disclosure and various embodiments with various modifications as are suited to the particular use contemplated. It is intended that the following claims and their equivalents define the scope of the disclosure.

Based on the teachings contained in this disclosure, it will be apparent to persons skilled in the relevant art(s) how to make and use embodiments of the disclosure using data processing devices, computer systems and/or computer architectures other than that shown in FIG. 16. In particular, embodiments may operate with software, hardware, and/or operating system implementations other than those described herein.

It is to be appreciated that the Detailed Description section, and not the Abstract section, is intended to be used to interpret the claims. The Abstract section may set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus the disclosure should not be limited by any of the above-described exemplary embodiments. Further, the claims should be defined only in accordance with their recitations and their equivalents.

What is claimed is:

1. A touchscreen system comprising:
   a touchscreen device comprising U-drive electrodes and V-sense electrodes that intersect at an acute angle, $\theta$, and having a rectangular touch sensitive area with horizontal edge of length (W) and a vertical edge of length (H); and
   a controller coupled to the touchscreen device, configured to:
   transmit drive signals via N drive channels, where N is an integer, wherein the N drive channels are communicatively coupled to P U-drive electrodes,
   where P is an integer greater than or equal to N,
   wherein members of a subset of the P U-drive electrodes communicatively coupled to one of the N drive channels, intersect mutually exclusive sets of the V-sense electrodes; and wherein based on a value of θ, signals corresponding to the drive signals traverse path lengths that are less than W plus H, wherein $\theta_D$ comprises an acute angle between the vertical edge and a V-sense electrode of the V-sense electrodes, and wherein φ=0, wherein $\theta_D$ comprises an angle between the vertical edge and a diagonal of the rectangular touch sensitive area, and wherein $0° < \theta < \theta_D$, and wherein a quantity, $$\left(1 + \frac{R}{2}\right)\cos(\theta)$$

is greater than one, wherein aspect ratio, R, equals $\tan(\theta_D)$.

2. The touchscreen system of claim 1, wherein the path lengths corresponding to the drive signals are less than H plus half of W.

3. The touchscreen system of claim 1, wherein a pitch of the U-drive electrodes is less than a pitch of the V-sense electrodes.

4. The touchscreen system of claim 3, wherein the pitch of the U-drive electrodes is sin(θ) times the pitch of the V-sense electrodes.

5. A method for a controller coupled to a touchscreen device, wherein the touchscreen device comprises U-drive electrodes and V-sense electrodes that intersect at an acute angle, θ, and a rectangular touch sensitive area with horizontal edge of length W and a vertical edge of length H, the method comprising:

transmitting drive signals via N drive channels, where N is an integer, wherein the N drive channels are communicatively coupled to P U-drive electrodes, where P is an integer greater than or equal to N, wherein members of a subset of the P U-drive electrodes communicatively coupled to one of the N drive channels intersect mutually exclusive sets of the V-sense electrodes; and receiving measurements in response to the drive signals via the V-sense electrodes, wherein based on a value of θ, the measurements correspond to signals traversing path lengths that are less than W plus H, wherein $\theta_D$ comprises an angle between the vertical edge and a diagonal of the rectangular touch sensitive area, wherein $0° < \theta < \theta_D$; and wherein $0° < \varphi < \arctan(W/(2H))$, wherein φ comprises an acute angle between the vertical edge and V-sense electrodes, and wherein a quantity, $$\sqrt{\frac{\left(1 + \frac{R}{2}\right)^2 \cos\phi}{\max\left(\frac{1}{\cos^2\phi}, \frac{1}{\cos^2(\theta - \phi)}\right)}}$$

is greater than one, wherein aspect ratio, R, equals tan $(\theta_D)$.

6. The method of claim 5, wherein a pitch of the U-drive electrodes is less than a pitch of the V-sense electrodes.

7. The method of claim 6, wherein the pitch of the U-drive electrodes is sin(θ) times the pitch of the V-sense electrodes.

8. A non-transitory computer-readable medium storing instructions that, when executed by a controller coupled to a touchscreen device, cause the controller to perform operations, wherein the touchscreen device comprises U-drive electrodes and V-sense electrodes that intersect at an acute angle, θ, and a rectangular touch sensitive area with horizontal edge of length W and a vertical edge of length H, the operations comprising:

transmitting drive signals via N drive channels, where N is an integer, wherein the N drive channels are communicatively coupled to P U-drive electrodes, where P is an integer greater than or equal to N, wherein members of a subset of the P U-drive electrodes communicatively coupled to one of the N drive channels intersect mutually exclusive sets of the V-sense electrodes; and receiving measurements in response to the drive signals via the V-sense electrodes, wherein based on a value of θ, the measurements correspond to signals that traverse path lengths that are less than W plus H, wherein φ comprises an acute angle between the vertical edge and a V-sense electrode of the V-sense electrodes, and wherein φ=0, wherein $\theta_D$ comprises an angle between the vertical edge and a diagonal of the rectangular touch sensitive area, and wherein $0° < \theta < \theta_D$, and wherein a quantity, $$\left(1 + \frac{R}{2}\right)\cos(\theta)\sqrt{\frac{1}{\sin\theta}}$$

is greater than one, wherein aspect ratio, R, equals $\tan(\theta_D)$.

9. The non-transitory computer-readable medium system of claim 8, wherein a pitch of the V-sense electrodes is less than a pitch of the U-drive electrodes.

10. The non-transitory computer-readable medium of claim 9, wherein the pitch of the V-sense electrodes is sin(θ) times the pitch of the U-drive electrodes.

* * * * *

UNITED STATES PATENT AND TRADEMARK OFFICE
CERTIFICATE OF CORRECTION

PATENT NO. : 11,327,619 B2
APPLICATION NO. : 17/028357
DATED : May 10, 2022
INVENTOR(S) : Vincent Pallaver It is certified that error appears in the above-identified patent and that said Letters Patent is hereby corrected as shown below:

In the Claims

Column 23, Line 4, Claim 1 replace "wherein $\theta_D$ comprises" with --wherein $\varphi$ comprises--.

Column 24, Line 47, Claim 9 replace "non-transitory computer-readable medium system" with --non-transitory computer-readable medium--.

Signed and Sealed this
Fourteenth Day of June, 2022

Katherine Kelly Vidal
*Director of the United States Patent and Trademark Office*